US012778161B2

(12) United States Patent
Xu

(10) Patent No.: US 12,778,161 B2
(45) Date of Patent: *Nov. 3, 2026

(54) ARTIFICIAL DEHYDRATED PIZZLE OF EDIBLE PET CHEW

(71) Applicant: Shanghai Sunlight Innov Trading Co., Ltd., Shanghai (CN)

(72) Inventor: Guangqiang Xu, Shanghai (CN)

(73) Assignee: Shanghai Sunlight Innov Trading Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/031,459

(22) Filed: Jan. 18, 2025

(65) Prior Publication Data

US 2025/0194645 A1 Jun. 19, 2025

Related U.S. Application Data

(63) Continuation-in-part of application No. 18/215,822, filed on Jun. 28, 2023, now Pat. No. 12,245,617, and a continuation-in-part of application No. 17/931,540, filed on Sep. 12, 2022, now Pat. No. 12,268,226, said application No. 18/215,822 is a continuation of application No. 17/481,302, filed on Sep. 21, 2021, now abandoned, said application No. 17/931,540 is a continuation-in-part of application No. 17/481,302, (Continued)

(51) Int. Cl.

| | |
|---|---|
| *A23K 40/25* | (2016.01) |
| *A23K 10/26* | (2016.01) |
| *A23K 10/30* | (2016.01) |
| *A23K 20/158* | (2016.01) |
| *A23K 50/40* | (2016.01) |
| *A23K 50/42* | (2016.01) |

(52) U.S. Cl.
CPC .............. *A23K 40/25* (2016.05); *A23K 10/26* (2016.05); *A23K 10/30* (2016.05); *A23K 20/158* (2016.05); *A23K 50/40* (2016.05); *A23K 50/42* (2016.05)

(58) Field of Classification Search
CPC ...... A23K 40/25; A23K 20/158; A23K 50/40; A23K 50/42; A23K 10/26; A23K 10/30; A23K 10/20; A01K 15/025; A23N 17/005
See application file for complete search history.

(56) References Cited

U.S. PATENT DOCUMENTS

2005/0271775 A1* 12/2005 Kirch .................... A23K 10/26 426/104
2006/0107906 A1* 5/2006 Weinberg .............. A23K 40/30 119/710

(Continued)

*Primary Examiner* — Trinh T Nguyen
(74) *Attorney, Agent, or Firm* — Xuan Zhang

(57) ABSTRACT

An edible pet chew includes a member of curved Artificial Bully Stick (artificial dried pizzle) formed from a composition material with at least 20% plant ingredient imitating existing traditional bully stick products, serving as an alternative to traditional bully stick product (such as bully ring, bully spiral, bully braid, etc.). The imitation includes the structure, and/or appearance, and/or size, and/or color, and/or texture, and/or flavor, and/or durability, and/or palatability of traditional bully stick product (such as bully stick ring, bully spiral, bully braid, etc.). Preferably it is an extrudate processed by an extruder and further re-shaped to end product configurations (such as a curl, ring and braid configuration).

20 Claims, 9 Drawing Sheets

Related U.S. Application Data filed on Sep. 21, 2021, now abandoned, and a continuation-in-part of application No. 17/478,986, filed on Sep. 20, 2021, now Pat. No. 12,161,088, said application No. 17/481,302 is a continuation of application No. 16/190,118, filed on Nov. 13, 2018, now Pat. No. 11,122,820, said application No. 17/478,986 is a continuation-in-part of application No. 16/190,118, filed on Nov. 13, 2018, now Pat. No. 11,122,820, which is a continuation-in-part of application No. 15/680,721, filed on Aug. 18, 2017, now Pat. No. 10,159,266.

(56) References Cited

U.S. PATENT DOCUMENTS

| | | | | |
|---|---|---|---|---|
| 2006/0243219 | A1* | 11/2006 | Brown | A01K 15/026 119/710 |
| 2007/0289552 | A1* | 12/2007 | Axelrod | A23K 20/163 119/710 |
| 2008/0118606 | A1* | 5/2008 | Stern | A23N 17/005 426/282 |
| 2009/0004328 | A1* | 1/2009 | Weinberg | A23K 50/42 426/4 |
| 2011/0139087 | A1* | 6/2011 | Lang | A23K 40/25 119/709 |
| 2011/0262587 | A1* | 10/2011 | Stern | A23K 40/25 119/710 |
| 2014/0044838 | A1* | 2/2014 | Xu | A23K 50/42 426/282 |
| 2014/0137810 | A1* | 5/2014 | Stern | A23K 40/25 119/710 |

* cited by examiner

ARTIFICIAL DEHYDRATED PIZZLE OF EDIBLE PET CHEW

CROSS REFERENCE OF RELATED APPLICATION

This application is a Continuation-in-par application of, and claims priority benefit to U.S. application Ser. No. 18/215,822 by Xu, entitled "ARTIFICIAL BUYLLY STICK OF EDIBLE PET CHEW", filed on Jun. 28, 2023, Which is a Continuation-in-par application of U.S. application Ser. No. 17/481,302 by XU, entitled "ARTIFICIAL BULLY STICK OF EDIBLE PET CHEW," filed Sep. 21, 2021, which is a continuation application of U.S. application Ser. No. 16/190,118 by XU, entitled "EDIBLE PET CHEW OF ARTIFICIAL BULLY STICK," filed Nov. 13, 2018, now issued U.S. Pat. No. 11,122,820, which is a continuation-in-part of U.S. application Ser. No. 15/680,721 by XU, entitled "EDIBLE PET CHEW OF ARTIFICIAL BULLY STICK," filed Aug. 18, 2017, now issued U.S. Pat. No. 10,159,266.

This application is also a continuation-in-part application of U.S. application Ser. No. 17/931,540, filed on Sep. 12, 2022, Which is a Continuation-in-par application of U.S. application Ser. No. 17/478,986, filed on Sep. 20, 2021, which is a continuation-in-part application of U.S. application Ser. No. 16/190,118, filed on Nov. 12, 2018, now issued as U.S. Pat. No. 11,122,820, which is a continuation-in-part application of U.S. application Ser. No. 15/680,721, filed on Aug. 17, 2017, now issued as U.S. Pat. No. 10,159,266.

This application also claims priority to CN application Ser. No. 20/171,0697772.9 filed Aug. 15, 2017.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The field of this invention relates to an Edible Pet Chew.

Description of Related Arts

Domestic pets, primarily dogs, have an instinct to chew which keeps their teeth healthy, exercises their jaws and teeth and keeps teeth clean. "Pet Chew" products have been introduced to the market for many years to accommodate that instinctive urge to chew in a healthy direction.

"Pet Chews" are intended to be chewed by a pet/dog for an extended period of time before being digested. A great part of pet chew products in the market are dried animal pizzel (traditional Bully Sticks) products welcome very much by dogs and consumers, which are made of natural bovine penis. Generally, foreskin of bovine penis is removed, cleaned and then dehydrated by for example heating or freeze-drying. It enjoys an inherent "good palatability" and "durability (after dehydrating process)" which makes it an outstanding successful product in the trade.

However, traditional dried animal pizzel (bully stick) products have some drawbacks, such as:

1. Extremely high price per gram. Due to the natural scarcity property with the source of natural bovine pizzle, raw materials (bovine pizzle) for producing dried animal pizzle (traditional Bully Stick) are sold at an extremely high price, which creates the final products, dried animal pizzle products (or say traditional bully sticks, including bully curls, rings, braids), being sold to consumers at an extremely high price.
2. Materially hard to acquisition due to natural scarcity property with the source of natural bovine pizzle.

On the market, there is another popular product in a form of extruded product (such as a stick shaped product, or a product initially in a stick shape further be re-shaped to end product in a curved forms such as a curl, twist, ring, spiral, spring, pretzel, dual-stand braid, triple-strand-braid and knots), typically formulated by plant-based materials, enjoying a low-cost material. Also, it is a product with "durability" property which can provide a long chewing time for dogs. However, these kinds of product are sold by many distributors/retailers under a great competition. The competition is a homogeneous one, in which a product is hard to be well distinguished from another. A homogeneity product is hard to attract consumers to buy.

What is required is to provide a pet chew overcoming the drawbacks above-mentioned accompanying the existing dried animal pizzel (traditional bully stick) product and extruded products.

U.S. application Ser. No. 13/858,592 by Shrestha, filed on Apr. 8, 2013, disclosed a pet chew comprising a hardened cheese and a dry animal tissue such as bully sticks attached to the cheese piece. And it also disclosed a kind of animal tissue puff such as bully puff. However, the bully sticks or bully puff it attempted to apply as still is traditional bully sticks, no new matters. It still has the drawbacks of traditionally bully stick as aforementioned.

U.S. Pat. No. 8,479,687 by Anderson, filed on Feb. 14, 2007, disclosed a pet chew with rawhide and traditional bully stick (or steer penis) woven together. Since it's still a traditional bully stick product, it suffers the drawbacks of traditional bully stick aforementioned.

U.S. Pat. No. 8,074,609B2 by Grant Adkins, filed on Mar. 25, 2010, disclosed a rawhide pet chew with a traditional bully stick wrapped in. But since it's still a traditional bully stick product, it suffers the drawbacks of traditional bully stick aforementioned.

U.S. Pat. No. 7,677,203 by Stern, filed on Nov. 21, 2006, disclosed a pet chew with a plant-based outer casing and a chewy edible material positioned within the casing. However, it is silent about an intention to make a bully-stick-like product imitating bully stick. The products it disclosed have nothing to do with traditional bully stick, which doesn't have any features of imitating traditional bully stick. And also, it fails to disclose an extruded pet chew with pizzle ingredient.

U.S. application Ser. No. 14,295,009 by Doerr, filed on Jun. 3, 2014, disclosed a pet chew comprising an amylase filling and a collagen casing. Collagen casing in the trade or in a common sense refers to a type of thin, edible casings (sausage casing) made from animal collagen, primarily from the skin, bones, and connective tissues of cows or pigs. It serves as an alternative to traditional natural casings made from the intestines of animals.

SUMMARY OF THE PRESENT INVENTION

An embodiment of the present invention is to provide a pet chew having an artificial dehydrated/dried pizzle component with plant ingredient and animal ingredient (typically meat and/or meat-by-product materials) imitating dried animal pizzle (traditional Bully Stick) products which is very much welcome by dogs and consumers Another embodiment of the present invention is to provide a pet chew having an artificial dehydrated/dried pizzle component including pizzle ingredient in formula imitating dried animal pizzle (traditional Bully Stick) products.

Another embodiment of the present invention is to provide a pet chew with both "inherently good palatability" and "durability" simultaneously.

Another embodiment of the present invention is to provide an edible pet chew serving as an alternative to existing dried animal pizzle (traditional Bully Stick) product by imitating the structure, and/or appearance, and/or size, and/or color, and/or texture, and/or flavor, and/or durability, and/or palatability of dried animal pizzle (traditional Bully Stick).

Another embodiment of the present invention is to provide an edible pet chew incorporating two existing popular products into a single product, where the two existing products are plant-based extruded product (for example plant-based tooth-brush shaped chew,) and dried animal pizzle (traditional Bully Stick) product.

Another embodiment of the present invention is to provide an edible pet chew with an outer layer and an inner member, wherein the outer layer is with good durability and strength, which imitate a feature of dried animal pizzle (traditional Bully Stick).

Another embodiment of the present invention is to provide an edible pet chew having an artificial dehydrated/dried pizzle component with a cross-section outline shape similar to that of dried animal pizzle (traditional Bully Sticks).

Another embodiment of the present invention is to provide an edible pet chew formed from a composition material.

Another embodiment of the present invention is to provide an Artificial Bully Stick (or Bully-Stick-LIKE) pet chew which is hugely cheaper than dried animal pizzle (traditional Bully Stick).

Another embodiment of the present invention is to provide an Artificial Bully Stick pet chew which is raw-material-acquisition comparatively hugely easier than dried animal pizzle (traditional Bully Stick).

Another embodiment of the present invention is to provide an edible pet chew having an artificial dehydrated/dried pizzle component with pizzle material. The artificial dehydrated/dried pizzle component is obtained by extruding process with an extruder, so as to achieve the "chewy" property of the pet chew products.

An embodiment of the present invention is to provide an edible pet chew with limited rawhide ingredient in the products or even without rawhide ingredient.

An embodiment of the present invention is to provide an edible pet chew including an Artificial Bully Stick chew member and an edible material member being assembled together.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
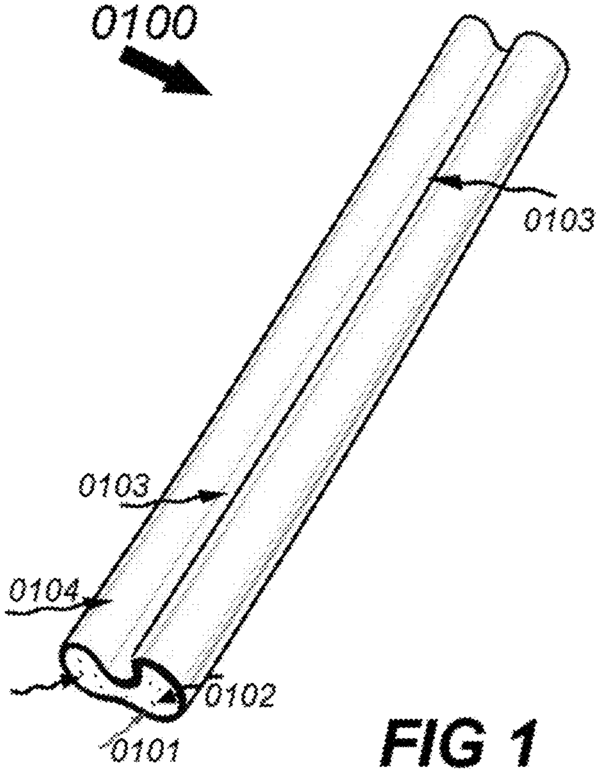
FIG. 1 is a top plan view of an Artificial Bully Stick (or say Bully-Stick-LIKE) pet chew with a stick configuration, with a cross-section outline shape like letter "B".

The following description is disclosed to enable any person skilled in the art to make and use the present invention. Preferred embodiments are provided in the following description only as examples and modifications will be apparent to those skilled in the art.

The general principles defined in the following description would be applied to other embodiments, alternatives, modifications, equivalents, and applications without departing from the spirit and scope of the present invention.

The term of "composition" or "composite" in the present disclosure generally may refer to a product of mixing or combining two or more ingredients or elements (or constituents, or materials), esp. a mixture of the ingredients (elements or materials). But it should be noted that, somewhere in the present disclosure, the term of "composition" may also refer to the ingredients (parts) of which something is composed or made of; constitution.

It should be noted the term of "rawhide sheet" or "rawhide" in the chew industry as a most popular material to form dog chews, generally refers to a layer of skin/hide obtained from slaughter of animals (especially the animals such as bovine, porcine, cattle, cow, water buffalo and pig), which is made of a by-product of the leather industry. The "rawhide" may not be exposed to tanning process or may be partially tanned and generally fur, meat and fat is removed. It may also be called traditional rawhide. As a typical process to prepare the rawhide, split the layer of skin to a number of more layers according to pre-determined thickness, soak the split layers in lime solution and clean (and bleach) the skins in rolling drums, have it sterilized with hydrogen peroxide, and dry the skin layers to a moisture content less than 30% or so. In the whole process, a range of chemicals, such as lime solution, NaOH, NH4Cl, are deployed. "Rawhide-free animal skin" refers to animal skin layer materials that are free of aforementioned rawhide. "Rawhide-free animal skin" or "animal skin free of rawhide" may include but not limited to the animal skin layer materials that are free of aforementioned rawhide and/or the aforementioned manufacturing process and does not fall into the definition of aforementioned rawhide. "Corium (dermis) layer of animal skin" or "innermost layer of animal skin" as employed in the present disclosure is an embodiment of the "rawhide-free animal skin". Compared to rawhide material that is largely used in chew recipe for decades, since "corium (dermis) layer of animal skin" collagen material is made from much more natural sources, they are considered to be much less involved in adding chemicals in the process of hide manufacture or even free of the chemical additives (such as NH4CL, H2O2 and NaOH) commonly found in rawhide material production. What's more, rawhide may not be easily digestible and end up causing unnecessary digestive discomfort. The corium (dermis) layer of animal skin typically is made from natural sources of collagen, such as beef skin. Unlike rawhide, corium (dermis) layer of animal skin undergoes minimal processing, making them a more natural option. Since corium (dermis) layer of animal skin is made from natural sources, they are free of the chemical additives commonly found in rawhide manufacture. This makes it a more natural treat option.

The term of "starch" in the present disclosure generally refers to a carbohydrate food substance obtained from a plant. Some examples include starches derived from potato, sweet potato, mung bean, wheat, corn, tapioca, rice, pea, and mixtures thereof. The starch can be used in its native form, but it may also be physically or chemically modified before being applied. Of course, it is also possible to use combinations of native starch and modified starch, or combinations of different modified starches.

It should be noted that the term "plant" in the present disclosure generally refers to an edible part of a plant or an edible material derived from a plant, where the plant material includes, but not limited to: a plant material (such as potato, sweet potato, mung bean, wheat, corn, tapioca, rice, pea, soybean, peanut, almond, mushroom, legumes, beans, grains, chia seed, algae, seaweed, spirulina, cereals and mixtures thereof), a material of edible part of a plant, a plant derived material, a plant protein, a plant starch, a plant fiber, a vegetable material, a vegetable derived material, a vegetable protein, a vegetable starch and mixtures thereof.

"Animal ingredient" refers to the materials obtained from a slaughtered animal (such as vertebrate animal, livestock animal, bovine, porcine, ovine, caprine, poultry and fish), including meat, meat by-product (including animal skin) or a combination thereof, other than feather, horn, hair, teeth, hooves. The term of "meat" generally refers to the clean flesh derived from slaughtered animals (including but not limited to mammals, livestock, bovine, porcine, cattle, pig, poultry, chicken, duck, turkey and fish) and is limited to that part of the striate muscle which is skeletal or that part which is found in the tongue, in the diaphragm, in the heart or in the esophagus; with or without the accompanying and overlying fat, sinew, nerve and blood vessels which normally accompany the flesh. In other words, "meat" may refer to primarily the muscle tissue of an animal. Exemplary materials include poultry flesh, bovine flesh, ovine flesh, caprine flesh, turkey flesh, chicken flesh, beef, pork, and fish flesh. The term of "meat by-product(s)" in the present disclosure generally refers to (preferably non-rendered) clean parts, other than meat, derived from slaughtered animals (such as mammals, fish, and poultry), which includes, but is not limited to skin, cartilage, trachea, animal ear, poultry foot, esophagus, animal pizzle, ligament, pericardium, tendon, lungs, spleen, kidneys, brain, livers, blood, bone, partially defatted low-temperature fatty tissue, stomachs and intestines free of their contents and a combination thereof. "Meat by-product" may also be a material selected from the group consisting of: corium (dermis) layer of skin, eggshell membrane, milk, milk powder, milk-derived material, cheese, cheese-derived material, whey, whey protein powder, whey-derived material, egg, and egg-derived material. Some other exemplary materials are chicken liver, bovine tendon, bovine lungs, porcine fat, beef bone powder and pig stomach.

It should be noted that the term "assemble" means to fit together all separate parts/members/components of a pet chew product. For example, several separate components of a pet chew are manipulated (such as knotting, wrapping, stuffing, rolling, folding, braiding, and twisting) by hand or by machine to have the components together form a pet chew product in a predetermined relationship.

The term of "collagen" in the present disclosure under a broader sense may refer to any form of collagen, in which the collagen may be present in the forms including but not limited to: a collagen molecule, a collagen chemical, a collagen compound, a collagen supplement (natural or synthetic), a compound consisting essentially of collagen molecule, a collagen composite consisting essentially of collagen molecule, collagen molecule/chemical/compound contained in a naturally-occurring material as a source of collagen, a collagen peptide ("collagen peptide" herein is derived from collagen through a process such as enzymatic hydrolysis process, which breaks down the large collagen molecules into smaller peptides and this enzymatic process results in collagen peptides with a low molecular weight, making them highly bioavailable and easily absorbed; "collagen peptide" may also be referred to as "hydrolyzed collagen" in some cases), a hydrolyzed collagen, extracted collagen molecule from animal natural parts and any combination thereof. "Collagen" may also include the material in the form of gelatin. Typically, the term of "collagen" in the present disclosure refers to any one of: a collagen molecule, a collagen chemical, a collagen supplement (natural or synthetic), a collagen peptide, a hydrolyzed collagen and any combination thereof. Some "collagens" in the present disclosure may be prepared by hydrolysis or extraction from natural Animal Parts such as cartilage, skin, and tendon. Regarding collagen extraction, collagen can be basically obtained by chemical hydrolysis and enzymatic hydrolysis. In some embodiments, "collagen" particularly refers to corium (dermis) part of animal skin treated by enzymatic method. Fibrillar collagen such as the corium (or dermis) layer of animal skin (such as bovine skin, porcine skin, beef hide, porkhide) may be of type I collagen as the most abundant fibrillar collagen in most tissues is type I collagen. Fibrillar collagen is primarily present in fibril surfaces and connective tissues of the skin and bones. “Collagen” is a protein that is crucial for dog’s overall well-being. It makes up a significant part of the skin, bones, tendons, and other connective tissues.

As a contrast, “collagen” in a scientific definition in a narrower sense may refer to the fundamental elements of various connective tissues in animal bodies (such as skin, tendons, and ligaments), as one of the most abundant proteins in animal bodies produce, which may be made from three chains of amino acids arranged into a helix pattern that may be found in animal muscles, tendons, cartilage, skin and bones. Amino acid glycine may be present in most collagen chains, with proline and hydroxyproline also being common.

The term of “animal skin (esp. bovine skin, porcine skin)” may refer to a skin material composed of several layers, where the layers may include epidermis layer (epidermis may also be referred to as tough outer layer), dermis layer (dermis may also be referred to as corium). A hypodermis (flesh layer may be a part of the hypodermis) layer may also be mentioned, but in the industry, the hypodermis layer may not be considered a part of “animal skin”.

The term of “collagen-based” in the present disclosure may refer to a composition material containing any one of: at least 20% naturally-collagen-rich material by weight, at least 10% collagen (constituent, element, or ingredient) by weight and a combination thereof. Alternatively, a “collagen-based” material may additionally contain at least 20% plant ingredient or at least 20% starch ingredient. Typically, the “collagen-based” composition contains at least 25% (more typically, at least 30%) naturally-collagen-rich material by weight or at least 10% collagen (constituent, element, or ingredient) by weight, where “at least 25% naturally-collagen-rich material” in the composition may be in accordance with the “dinners, entrees, platters, nuggets, recipe and formulas” rule under existing AAFCO labeling requirement. In some embodiments, all naturally-collagen-rich material ingredient(s) existing in the “collagen-based” composition added together account for the number one proportion ingredient(s) in the material by weight, which is larger than any other individual (or single) ingredient existing in the material (such as corn starch, isolated soybean protein, chicken, chicken liver, glycerin, sugar, sorbitol, and vegetables). In some embodiments of the present disclosure, the “collagen-based” composition contains at least 50% naturally-collagen-rich material by weight, in which naturally-collagen-rich material may serve as a majority ingredient by weight in the constitution of the composition. To form the artificial dehydrated pizzle component, in some preferred embodiments, the “collagen-based” composition contains no greater than 90% naturally-collagen-rich material (or no greater than 80% collagen constituent) by weight, which may well accommodate the extrusion process requirements for extruding the composition and may produce a durable extrudate in final end product. In some embodiments of the present disclosure, typically the “collagen-based” composition contains at least 25% (more typically at least 30%) collagen (constituent, element, or ingredient) by weight in final end product, where “at least 25% collagen (constituent, element or ingredient)” in the composition may meet the “dinners, entrees, platters, nuggets, recipe and formulas” rule under existing AAFCO labeling requirement. In some embodiments of the present disclosure, the “collagen-based” composition contains at least 50% collagen (constituent, element, or ingredient) by weight, in which collagen (constituent, element or ingredient) may serve as a majority constituent by weight in the constitution of the composition. In some embodiments of the present disclosure, to form the “collagen-based” composition, the naturally-collagen-rich material is any one of: corium (layer) part of animal skin (animal skin such as beef skin, pork skin, bovine skin, porcine skin), dermis (layer) part of animal skin (animal skin such as beef skin, pork skin, bovine skin, porcine skin), innermost layer of animal skin (animal skin such as beef skin, pork skin, bovine skin, porcine skin), inner layer of animal skin (animal skin such as beef skin, pork skin, bovine skin, porcine skin), cartilage, trachea, animal ear, poultry foot, esophagus, animal pizzle, ligament, pericardium, animal tendon, eggshell membrane and any combination thereof. The phrase of “-based” generally means: (in a composition material) containing something as an important feature (or important part) (e.g., lead-based paints, collagen-based composition). The term of “naturally-collagen-rich” (equal to “inherently-collagen-rich) material, mainly as a particular meat by-product, in the present disclosure generally refers to any one of: a naturally occurring animal material (or a natural Animal Part material, or a natural organ material) that inherently/naturally contains at least 50% collagen (where collagen constituent may exist as a majority constituent by weight in the material) on dried matter basis; an animal material that is derived from a naturally occurring animal material (or a natural Animal Parts material, or a natural organ material) that inherently/naturally contains at least 50% collagen without aid of added collagen (where collagen constituent may exist as a majority constituent by weight in the material); and any combination thereof. Some typical examples of these “naturally-collagen-rich” material includes: corium (layer) part of animal skin, dermis (layer) part of animal skin, innermost layer of animal skin, inner layer of animal skin, cartilage, trachea, animal ear, poultry foot, esophagus, animal pizzle, ligament, pericardium, animal tendon, eggshell membrane, and any combination thereof. Corium (layer) or dermis (layer) part of animal skin, commonly obtained from bovine skin, porcine skin, ovine skin or caprine skin and especially obtained from bovine skin or porcine skin, may be a preferred embodiment of the “naturally-collagen-rich” material employed in the present disclosure as it usually contains at least 70% collagen (an example of corium layer of cattle skin sourced from a supplier contains about 89% collagen) and is of easy acquisition from the market. Preferably, the corium layer of animal skin does not undertake the process that rawhide regularly is prepared by as described in the definition paragraph of “rawhide” in the disclosure. Corium layer may be referred to as split (grain) layer as well. The particular layer of skin for rawhide manufacture such as the epidermis layer may be particularly avoided due to the reasons mentioned somewhere in the present disclosure. The layer of “junction of epidermis and corium” may also be used as a “naturally collagen-rich” material to make a pet chew in conjunction of corium layer as a part of the corium layer while sometimes the layer of “junction of epidermis and corium” could be an inferior material choice. In some embodiments, the “collagen-based” material may refer to an “animal skin corium layer-based” material formed from a composition including 25%-90% (or typically 50%-90%) corium layer of animal skin ingredient by weight in formula, in which animal skin corium layer ingredient preferably accounts for the number one proportion ingredient by weight, which is larger than any other individual (or single)

ingredient existing in the material (e.g. corn starch, isolated soybean protein, glycerin, chicken liver, sugar, sorbitol). Examples of "naturally-collagen-rich" material may also include non-rawhide animal skins such as poultry skin, turkey skin, ostrich skin, fish skin (they are not available for leather manufacture industry) while sometimes they could be of an inferior choice. Collagen content data of some specific meat by-products may be referred to as follows (actual collagen content may vary from these according to actual tested samples): corium layer of skin—89%, tendon—85%, intestine—19%, lung—18%, stomach—13%, animal bone—24%, kidney—5.2% and liver—2%. As for "meat" (muscle), it may contain less than 10% collagen. Other meat by-product materials (meat as well) that inherently contain less than 50% collagen may not be included in the scope of the definition of "naturally-collagen-rich" material because: applying the material in the aim of increasing the collagen content in a pet chew may ask for comparatively much more proportion of this material in the chew extrudate and the large proportion may not comply with other materials to produce an extrudate or not be adapted to the following extrusion process or even ruin the following extrusion process to produce a chewing-durable component to make an end product of a chew. (Notes: According to AAFCO, the "25%" or "dinner" rule applies to many canned and dry products. If the named ingredients comprise at least 25% of the product (not counting the water for processing), but less than 95%, the name must include a qualifying descriptive term, such as "Dinner" as in "Beef Dinner for Dogs"). Typically, a collagen-based composition material in the present disclosure has a chemical (e.g. humectant chemical such as glycerin, sorbitol) in the formula. In some embodiments, a collagen-based composition material in the present disclosure may have 2%-35% humectant (more typically 10%-25% humectants; humectants such as glycerin, sorbitol) ingredients as a kind of chemical in addition to naturally-collagen-rich material (or collagen constituent) ingredient.

It should be noted that the term of "Bully stick" refers to a pet chew product of dehydrated animal (especially but not limited to bovine animal, bovine especially refers to bull or steer) pizzle, or segment thereof, for dogs to chew on, where the pizzle is derived from a natural animal penis cut from slaughtered animals (especially bovine), typically with foreskin being removed. Bovine (especially bull or steer) penis, known in pet chew market as pizzles. This bully stick is so called dried animal pizzle (traditional Bully Stick) made of dehydrated a natural part of an animal (especially bovine).

Pet chew having an artificial dehydrated/dried pizzle component of present invention is intended to work as an alternative to traditional GENUINE Bully Sticks aforementioned.

The term of "Artificial Bully Stick pet chew" (or say Bully-Stick-LIKE pet chew) in present invention refers a pet chew or a pet chew member in a shape of stick formed from a composition material, imitating the features of traditional GENUINE bully stick product including structure, and/or appearance, and/or size, and/or color, and/or texture, and/or flavor, and/or durability, and/or palatability, but it is not a traditional GENUINE bully stick.

It is known that a market-popular pet chew product should include two major factors, i.e. property of "chewy" (durability) and property of "inherently good palatability". "Chewy" means a material that can endure a dog's chewing for a long time before its being ingested. "Good palatability" means a material with inherent attractant to dogs without adding additional artificial flavorings. A market-successful pet chew product is required to have both properties. Artificial Bully Stick pet chew disclosed by present invention is a product with both "inherently good palatability" and "durability".

Figure 6:
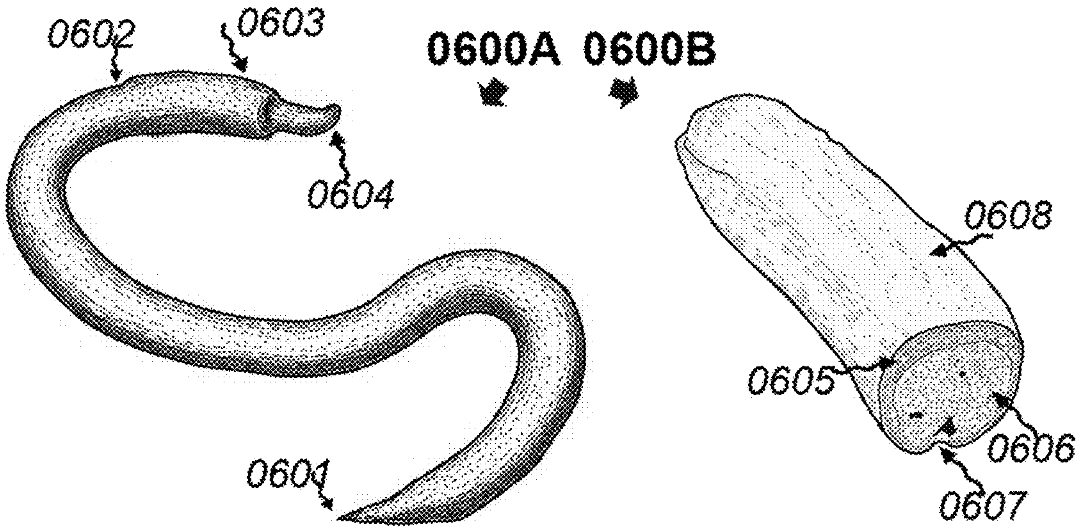
FIG 6 PRIOR ART
FIG. 6 is a prior art, a top plan view of a natural flesh of pizzle in a full length and a segment of a fresh pizzle, which works as a starting material for producing dried animal pizzle (traditional Bully Stick) chew.
Figure 7:
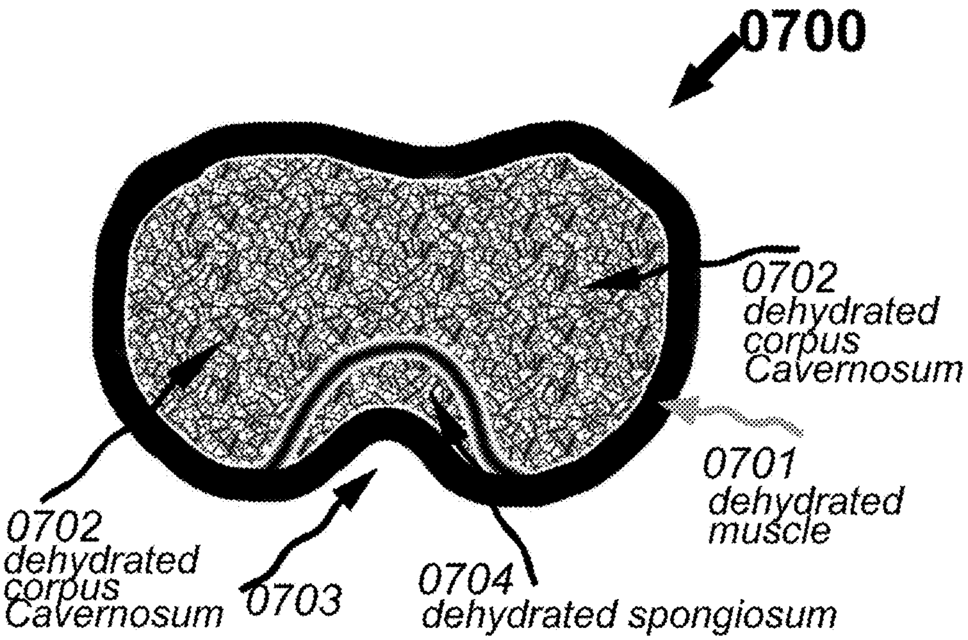
FIG 7 PRIOR ART
FIG. 7 is a prior art, a cross-section view of a final dried animal pizzle (traditional Bully Stick) product after dehydrating process.
Figure 8:
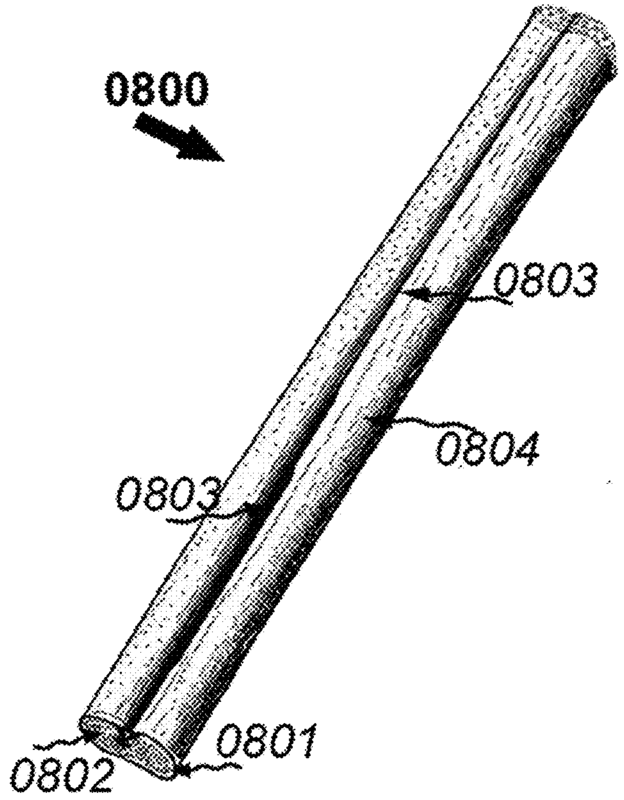
FIG 8 PRIOR ART
FIG. 8 is a prior art, a top plan view of a final product of a dehydrated bully stick with a typical cross-section outline shape resembling letter "B".

Before disclosing present invention, as a prior art, let's address a typical specification/structure and manufacturing process for these traditional GENUINE Bully Stick products as follows (from points 1 to 6):

1. Prepare natural flesh of pizzle. Now refer to FIG. 6 (Prior Art), 0600A gets ready which is cut from slaughtered bovine animal. 0601 is root of the bovine penis. Shaft part from point 0601 to 0602 is a typical portion of pizzle that is applied to make Bully Sticks. 0603 is glans of a pizzle, which is also can be included in finished products in some specific products. A segment of fresh pizzle 0600B. 0607 refers to a groove extending longitudinally along the whole pizzle on the surface. 0605 is muscle of the pizzle, serving as an outer layer for the whole pizzle piece distinguished from the inner member 0606. 0608 is the surface of the pizzle. 0606 includes tissues of corpus cavernosum, spongiosum, urethra, etc.
3. Having pizzle dehydrated to a controlled moisture value (typically 10%-16%) by for example solar drying, heating or freeze drying. FIG. 7 (Prior Art) is a cross-section figure for a final bully stick product after dehydrating process. This cross-section is with a typical outline shape similar to letter "B". 0701 is dehydrated muscle with hard quality. 0702 is dehydrated corpus cavernosum. 0703 refers to a groove running longitudinally along the pizzle. 0704 is dehydrated spongiosum.
4. FIG. 8 (Prior Art) is a final product, a dehydrated bully stick with a typical cross-section outline shape similar to letter "B". 0801 and 0804 is hard outer layer of the bully stick made of dehydrated muscle. 0802 is inner member including tissues of corpus cavernosum, spongiosum, urethra, etc. 0803 refers to a groove extending longitudinally along the whole bully sticks body on the surface.
5. 0901, 0902, 0903 and 0904 in FIG. 9 (Prior Art) reflect a group of various cross-section outline shapes that dried animal pizzle (traditional Bully Stick) may have. Also 1001 to 1007 in FIG. 10 (Prior Art) reflect a group of various cross-section outline shapes that dried animal pizzle (traditional Bully Stick) may have
6. Typical outstanding features (including structure features) of Bully Stick product are derived from and determined by aforementioned natural bovine penis natural features. It is disclosed by present inventor that, a typical dried animal pizzle (traditional Bully Stick) product has its essential typical features as follows (from A to K):

A. Bully stick includes an outer layer and an inner member, where the former holds the latter by surrounding it. This structure is derived from pizzle inherent structure. The outer layer is formed by muscle and inner member formed by tissues of corpus cavernosum, spongiosum, urethra, etc. Products in FIG. 7 (Prior Art) and 9 (Prior Art) reflect this pet chew structure.

B. After being dehydrated, inherently, the outer layer of Bully Stick formed by muscle enjoys a property of getting hard. The hardness ideally accommodates dog's chewing desire, making it an ideal pet chew product. Dried animal pizzle (traditional bully stick) makes itself outstanding with a longest durability hardness.

C. It is initially a stick shape material and finally shaped to end product form. And in some other bully stick products, it is initially a stick shape and is finally manipulated to a desired shape for example Spiral or Braid different from initial stick shape.

D. Bully stick has pizzle ingredient, which is a very strong flavor product enjoying an irresistible attraction to dogs. Pizzle ingredient offers "inherently good palatability" for the pet chew.

E. Cross-section of dried animal pizzle (traditional Bully Stick) presents characteristic outline shapes. A typical outline is in a shape similar to a capital letter "B" shape, or an Arabic numeral "8" shape, or a peanut shape, cashew shape, peanut icon shape, cashew nut icon shape, or heart icon shape. Products in FIG. 7 (Prior Art) and 9 (Prior Art) reflect this feature. Some other outline shapes are described in FIG. 9 (Prior Art) and 10 (Prior Art). (These outline shapes created by inherent feature of natural pizzles)

F. An inherent groove appears running longitudinally along the whole Bully Sticks body on the surface. Products in FIGS. 7 and 9 reflect this feature. This structural feature (groove) is a common one to most typical bully sticks products. (Identifying this observations. common feature requires careful There are various shapes/structures/appearance that bull stick products possess, which makes it hard to identify a common structural feature. The present applicant surprisingly discloses that, "groove" is a key feature that most typical bully sticks products possess although they have various shapes/structures and various cross-section shapes. This disclosure discloses a perfect imitation method to imitate dried animal pizzle (traditional Bully Stick) appearance).

G. Typical properties of the outer layer include: being translucent (semi-transparent) in the whole body of the outer layer or in its partial body, and with fiber-like texture. (these two properties of outer layer are created by the nature of the muscle that forms the outer layer)

H. Typical range of thickness of the outer layer is 0.3 mm-5 mm.

I. Typical properties of the inner member include: spongy, comparatively more unconsolidated or looser in texture than the muscle outer layer. For example FIGS. 7 and 9, product 0700/0800 has an inner member 0702/0802 which includes tissues of corpus cavernosum, spongiosum, urethra, which is unconsolidated. And there are some small holes spread substantially homogeneously to the inner member body. Refer to FIG. 7, 0702 from bully stick has tiny holes. (these properties of inner member are created by the nature of corpus cavernosum and/or spongiosum tissues that exist in a pizzle)

J. Inner member and outer layer have different appearance in color and/or texture. Inner member color is comparatively lighter than outer layer color. Inner member color is typically white or yellowing white. Outer layer color is typically light brown, brown, dark brown, red brown or muscle color. For example, 0802 from pet chew 0800 is in white color and 0801 is in light brown. Density of inner member is lighter than Bully Stick outer layer. For example, 0802 is lighter than 0801 in density. (these properties of color recognition are created by the nature of a pizzle)

K. Pizzle flavor. Dried animal pizzle (traditional bully stick) has an inherent characteristic pizzle flavor, which greatly attracts dogs to chew. As a sort of meat-by-product material, pizzle has a naturally strong flavor as other meat-by-product do, attractant to dogs.

All prior arts are silent with an intention to well imitate dried animal pizzle (traditional Bully Stick) with a composition material replacing the natural animal pizzle products. This new product requires surprising invention, where a skilled person with ordinary skills in this art can't disclose it. Especially, all prior arts are silent to create a pet chew with features of the following as a whole: it is an extruded stick with meat/meat-by-product ingredient and plant ingredient, with a translucent hard outer layer and an inner member, with cross-section outline shape of "B", or peanut, or "8" and with a groove extending longitudinally along its stick body on the surface.

It is also surprisingly disclosed by present inventor that, primary features of present invention are to imitate the properties/features/structure of dried animal pizzle (traditional Bully Stick) aforementioned. It's disclosed by present inventor that, a pet chew product must necessarily bear at least one property/feature as described above (especially A, B and C), OR, the pet chew will fail to imitate dried animal pizzle (traditional Bully Stick).

Artificial Bully Stick (or Bully-Stick-LIKE) Pet Chew of present invention imitating genuine bully stick is now being disclosed to serve as an alternative to traditional genuine Bully Sticks aforementioned, with significantly lower product cost, imitating some necessary properties or features (at least including appearance features) of dried animal pizzle (traditional Bully Stick). Artificial Bully Stick Pet Chew disclosed by present invention is distinguished from dried animal pizzle (traditional Bully Stick), where Artificial Bully Stick Pet Chew is typically formed from a stick-shaped extrudate or other alternative shaped extrudate (the extrude may be further curved into an end product configuration in curved-stick-form by manipulating or reshaping the initially-stick-shaped extrudate) and formed of a composition material with plant ingredient. As a contrast, dried animal pizzle (traditional Bully Stick) is substantially a single ingredient product without being processed other than dehydrating process.

One advantage of the Artificial Bully Stick (artificial dried pizzle) pet chew of present invention is hugely cheaper material cost than dried animal pizzle (traditional Bully Stick). The Artificial Bully Stick (artificial dried pizzle) pet chew is extremely cheaper than dried animal pizzle (traditional Bully Stick) which is made of substantially 100% bovine pizzle. The latter could be 4 times of the price of the former. Due to the natural scarcity property with the source of natural bovine pizzle, raw materials (bovine pizzle) for producing dried animal pizzle (traditional Bully Stick) are sold at an extremely high price, which creates the final products, dried animal pizzle (traditional Bully Stick), being sold to consumers at an extremely high price. Another advantage is, easier acquisition of raw material v.s. dried animal pizzle (traditional Bully Stick) products. Producing dried animal pizzle (traditional Bully Stick) products requires huge volume of natural animal pizzle. The Artificial Bully Stick (artificial dried pizzle) pet chew of present invention is preferably formed from a composition with meat-by-product ingredient (for example pizzle). For example, the composition has 10% pizzle in formula (90% is non-pizzle ingredient which is extremely acquisition-easier material than pizzle), in which producing this product just requires one tenth of pizzle material to manufacture the same quantity of finished products v.s. dried animal pizzle (traditional Bully Stick) products. Preparing the composition materials for production of Artificial Bully Stick (artificial dried pizzle) pet chew is much easier than dried animal pizzle (traditional Bully Stick).

Preferably, the Artificial Bully Stick (artificial dried pizzle) pet chew (or pet chew member) of present invention includes an outer layer and an inner member, where the former holds the latter by surrounding it, in a purpose to imitate a typical feature of dried animal pizzle (traditional Bully Stick). Preferably, the thickness of the outer layer is substantially homogenous along the whole stick body, like dried animal pizzle (traditional Bully Stick). Typical thickness of the outer layer is 0.3 mm-5 mm. Now refer to FIG. 1, 0100 is an extruded pet chew with outer layer of 0101 and inner member of 0102. Typically, the outer layers serve as an outer casing for the pet chew surrounding the inner member, together forming a stick-shaped end product or other alternative shapes (for example, a curve-shaped product whose longitudinal-cross-section profile is a curve which is formed by for example reshaping an initially-stick-shaped extrudate by twisting or curving by hand or machine).

Figure 2:
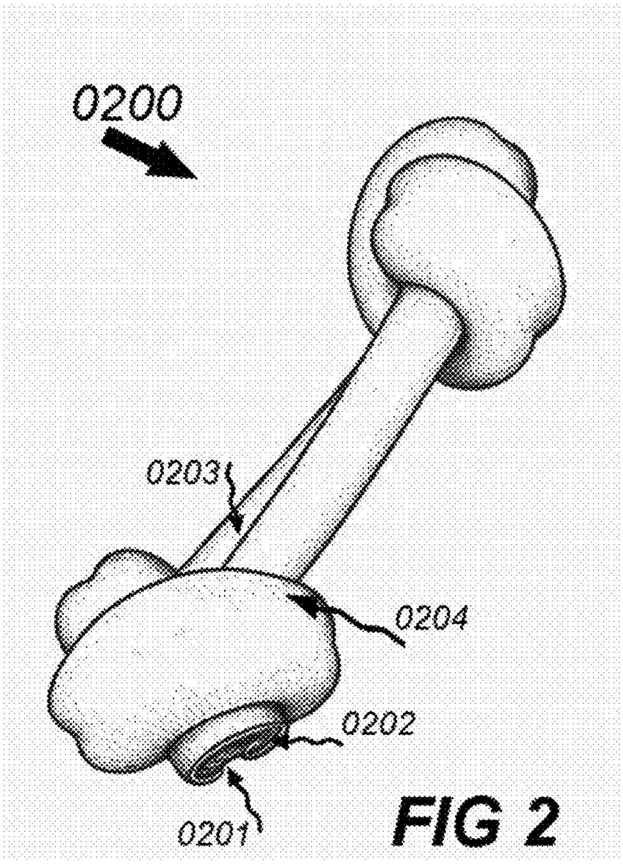
FIG. 2 is a top plan view of an Artificial Bully Stick pet chew with a knotted bone shape.
Figure 11:
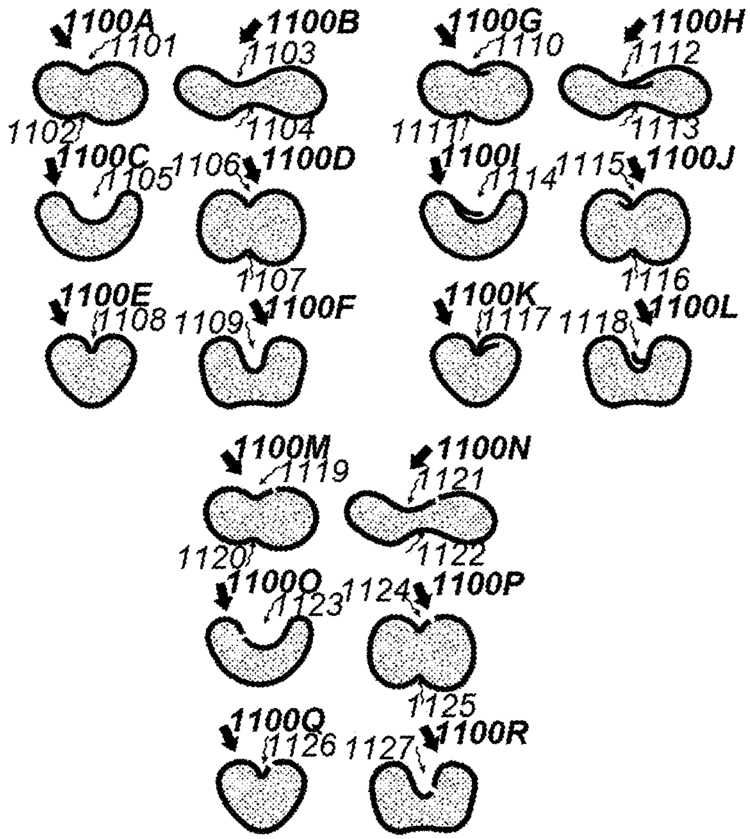
FIG. 11 shows 3 groups (totally 18) alternative cross-section outline shapes of a pet chew Artificial Dehydrated Pizzle component formed by co-extrusion according to the disclosure.

Cross-section outline shape of the Artificial Bully Stick (artificial dried pizzle) pet chew of present invention resembles the cross-section outline shape of natural Bully Sticks, with a purpose to imitate Bully Sticks. Natural bully sticks have various cross-section outline shapes which are inherently determined by raw material of pizzles. Preferably, cross-section of the Artificial Bully Stick (artificial dried pizzle) pet chew of present invention is substantially with an outline shape similar to any one of: a capital letter "B" shape, or an Arabic numeral "8" shape, or a peanut shape, cashew shape, peanut icon shape, cashew nut icon shape, or heart icon shape, imitating a typical cross-section outline shape of dried animal pizzle (traditional Bully Stick) as aforementioned. Refer to FIG. Now refer to FIG. 1, 0100 is an pet chew formed from an extrudate with a typical cross-section outline shape similar to letter "B", with a purpose to imitate a typical cross-section outline shape of dried animal pizzle (traditional Bully Stick). As shown in FIG. 11, cross-section profiles 1100A-1100F illustrate a group of six alternative cross-section outline shapes for six co-extruded Artificial Dehydrated Pizzle components of pet chews according to the present disclosure respectively. The shapes of 1100A and 1100B both are similar to a peanut icon. And the shapes of 1100C, 1100D, 1100E and 1100F resemble cashew nut icon, Arabic numeral "8", heart icon and capital letter "B" respectively. The cross-section shapes of the artificial bully sticks as illustrated in FIGS. 1-5 and 12 resemble a capital letter "B". As shown in FIG. 1 pet chew 0100 is an extruded pet chew with a typical cross-section outline shape similar to capital letter "B" corresponding to the cross-section outline shape 1100F from FIG. 11, with a purpose to imitate a typical cross-section outline shape of traditional bully sticks. And in some other alternative embodiments, the cross-section outline shape of pet chews 0100 FIG. 1 may be replaced by other desired shapes such as 1100A, 1100B, 1100C, 1100D and 1100E as illustrated in FIG. 11. Similarly, in some other embodiments, the cross-section outline shape of chews 0300, 0400 and 1200 from FIGS. 3, 4 and 12, may be replaced by the shapes as illustrated in FIG. 11 correspondingly according to desire. The cross-section shapes of the artificial bully sticks as illustrated in FIGS. 2 and 5 resemble a capital letter "B" and the outer layer of the artificial dried pizzle component is in a sheet form attached to the inner portion firmly. As shown in FIG. 2 and FIG. 5 pet chews 0200 and 0500 are extruded pet chew with a typical cross-section outline shape similar to capital letter "B" corresponding to the cross-section outline shape 1100R from FIG. 11, with a purpose to imitate a typical cross-section outline shape of traditional bully sticks.

As shown in FIG. 11, 1101-1109 refer to nine "trough" areas that refer to 9 troughs (grooves) in the six different cross-section shapes of pet chews according to the present disclosure.

The various cross-section profiles 1100A-1100R as shown in FIG. 11 refer to multi-layer extrudate artificial dehydrated pizzle components to form embodiments of the present disclosure, which has grooves 1101-1127. Cross-section profiles 1100A-1100F refer to a co-extruded artificial dehydrated pizzle component having two layers attached to each other firmly, outer layer of which is in a tube form. 1100G-1100L refer to a co-extruded artificial dehydrated pizzle component having two layers attached to each other firmly, outer layer of which is in a finned tubular form. 1100M-1100R refer to a co-extruded artificial dehydrated pizzle component having two layers attached to each other firmly, outer layer of which is in a curved sheet form.

Figure 9:
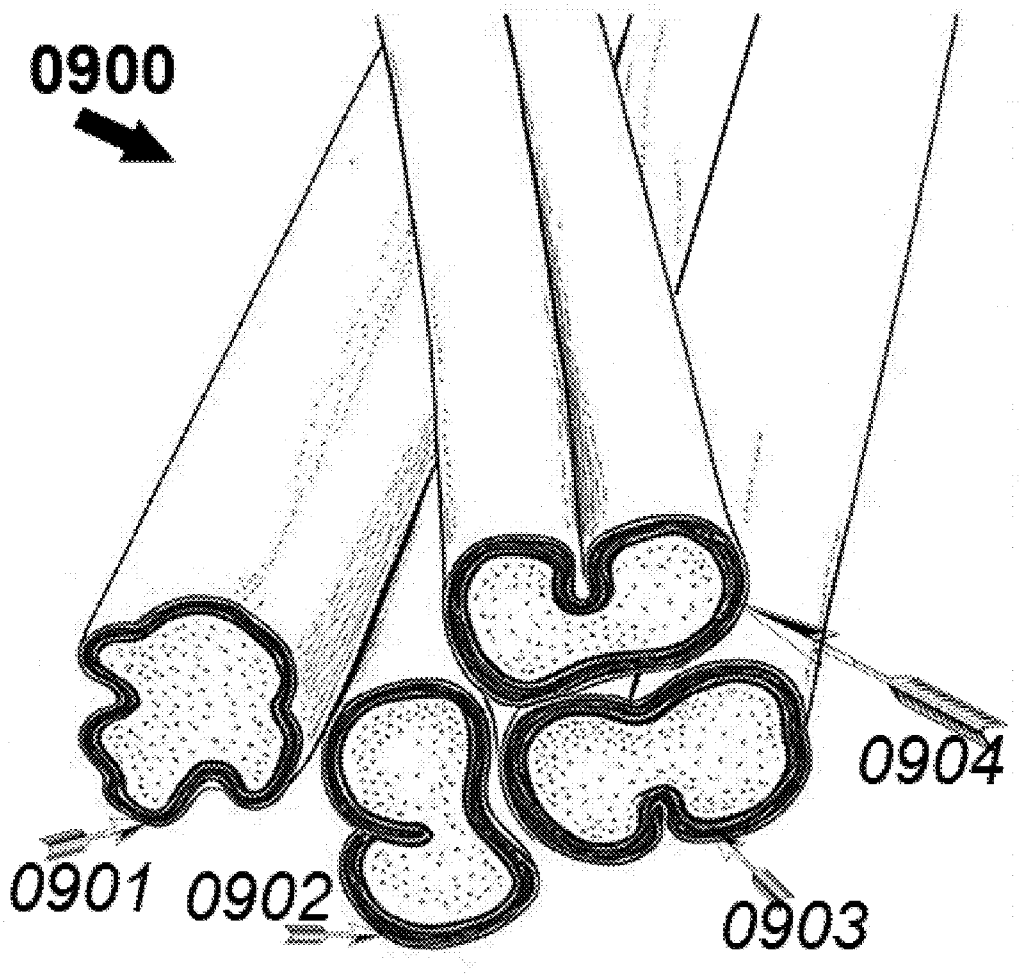
FIG 9 PRIOR ART
FIG. 9 is a prior art, a top plan view of a group of dried animal pizzle (traditional Bully Stick) products with various cross-section outline shapes.
Figure 10:
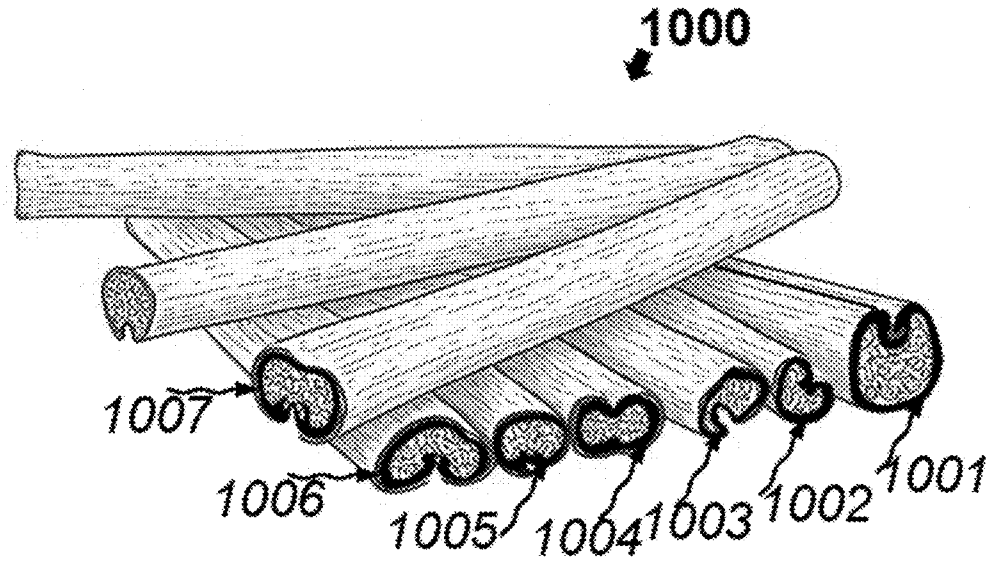
FIG 10 PRIOR ART
FIG. 10 is a prior art, a top plan view of another group of dried animal pizzle (traditional Bully Stick) products with various cross-section outline shapes.

Some other alternative outline shapes for the Artificial Bully Stick (artificial dried pizzle) pet chew can refer to the various ones that dried animal pizzle (traditional Bully Stick) may feature with as described in FIGS. 9 and 10.

Preferably, Artificial Bully Stick (artificial dried pizzle) pet chew (or pet chew member) of present invention has a (built-in) groove form running longitudinally along the whole chew body on the surface, with a purpose to imitate a typical inherent groove of dried animal pizzle (traditional Bully Stick) products. There are various shapes/structures/appearance that genuine bull stick products possess, which makes it hard to identify a common structural feature. The present applicant surprisingly discloses that, "groove" is a key feature that the Artificial Bully Sticks ((artificial dried pizzle) products should possess to imitate genuine bully stick appearance although genuine bully stick have various shapes/structures and various cross-section shapes. This disclosure discloses a perfect and easy imitation method to imitate dried animal pizzle (traditional Bully Stick) appearance. Typical groove depth (an average value of a single groove) of the Artificial Bully Stick (artificial dried pizzle) is at least 0.5 mm (more typically at least 1 mm) as genuine bully stick does. A normal groove depth (an average value of a single groove) of the Artificial Bully Stick (artificial dried pizzle) is about 2 mm-5 mm. Now refer to FIG. 1, 0100 is pet chew having an artificial dried pizzle component with groove 0103 along the stick body imitating natural Bully Sticks, which is formed by extruder die with pre-designed shape forming a groove in extruding process.

Preferably, inner member color of the artificial dried pizzle (artificial bully stick, or Bully-Stick-LIKE) pet chew is comparatively lighter than outer layer color, as GENUINE bully stick does. Now refer to FIG. 1, 0100 is an extruded pet chew with inner member of 0102 is lighter than muscle outer layer 0101 in color. Inner member color is typically white or yellowing white. Outer layer color is typically light brown, brown, dark brown, red brown or muscle color.

Preferably, complete body or partial body of the outer layer of the Artificial Bully Stick (or Bully-Stick-LIKE) pet chew of present invention is translucent where inner member inside is a bit visible through it, in a purpose to imitate a typical outer layer appearance of dried animal pizzle (traditional Bully Stick). While observing genuine bully stick product, it's concluded that a pet chew having an artificial dehydrated/dried pizzle component with a completely transparent/clear outer layer or with a completely opaque outer layer fails to well imitate the appearance of genuine bully stick. Now refer to FIG. 1 and FIG. 2, the area 0104/0204 is a one where inner member inside is a bit visible through it.

In some embodiments of present invention, the Artificial Dried Pizzle component is formed from an extrudate by an extruder. The extrudate may initially be in a stick shape after leaving the extruder and later be reshaped by hand or machine into any desired end product form. In an embodiment, the stick-shaped extrudate is reshaped into a curved form, such as a curl, twist, ring, spiral, spring, helix, pretzel shape, dual-stand braid, triple-strand-braid and knots, knotted bone, heart icon shape, triangle, quadrangle, pentagon, peanut icon shape, shape of Arabic numeral “8”, curved lines, open curve, closed curve, open circle, closed circle.

It should be noted that, all prior arts are silent to create a pet chew with features of the following AS A WHOLE: it’s an artificial bully stick, it is typically-stick-shaped extrudate (but it may finally reshaped to other alternative shapes in final end product such as a ring shape, a curl shape and a spiral shape) formed from a composition material with meat/meat-by-product ingredient and plant ingredient, with an inner member in lighter color than that of the outer layer, with an inner member and a translucent outer layer, with cross-section outline shape of “B”, or peanut, or “8” and with a groove running longitudinally along its stick body.

And preferably, the outer layer presents fiber-like texture, in a purpose to imitate a typical outer layer texture of dried animal pizzle (traditional Bully Stick). The thickness of outer layer of the Artificial Bully Stick (artificial dried pizzle) of present invention is typically 0.3 mm-5 mm, imitating the thickness feature of dried animal pizzle (traditional Bully Stick) products.

Preferably, inner member of the Artificial Bully Stick (artificial dried pizzle) pet chew of present invention has a hole, intended to imitate appearance/texture of inner part of dried animal pizzle (traditional Bully Stick) that is formed by tissues of corpus cavernosum and/or spongiosum. Alternatively, there are edible-granule-configurationed materials appearing in the body of the inner member (creating visual illusion of hole-like forms), being intended to visually imitate appearance/texture of inner part of dried animal pizzle (traditional Bully Stick) that is formed by tissues of corpus cavernosum and/or spongiosum. Preferably, these tiny holes or edible-granule-configurationed materials spread substantially homogeneously to the inner member body. Now refer to FIG. 1, 0100 is an extruded pet chew with inner member 0102 with edible-granule-configurationed materials spread into the inner member body. Preferably, inner member of the Artificial Bully Stick (artificial dried pizzle) pet chew of present invention is comparatively more unconsolidated or looser in texture than the muscle outer layer. Now refer to FIG. 1, 0100 is an extruded pet chew with inner member 0102 comparatively looser than muscle out layer 0101.

Preferably, the Artificial Bully Stick (or Bully-Stick-LIKE) pet chew includes artificial pizzle flavor (or say bully stick flavor) or hydrolyzed pizzle ingredient (this can also provide strong pizzle flavor) in its formula, which further enhances its attraction to consumers.

In some embodiments of present invention, the outer layer hardness of the Artificial Bully Stick (artificial dried pizzle) pet chew is with a durometer value between 80 and 100. In other embodiments of present invention, the outer layer hardness of the edible pet chew is with a durometer value between 60 and 80. In other embodiments of present invention, the outer layer hardness of the edible pet chew is with a durometer value between 50 and 60. In other embodiments of present invention, the outer layer hardness of the edible pet chew is with a durometer value between 40 and 50.

Now to disclose formulas that alternatively forms the Artificial Bully Stick (artificial dried pizzle) pet chew.

Now to define the phrase of “on an as formulated basis” in present invention that may be used in following paragraphs. It is about a means to determine weight percentages of an ingredient in a product. “On an as formulated basis” is also a method that currently FDA (or AAFCO) organizations of USA usually utilize to determine weight percentage for an ingredient in a product. By the means of “on an as formulated basis”, the weight percentage of an ingredient in a food is determined as it is added in the formulation of the food, including its inherent water content, not counting the water added for processing. All weight percentage values of ingredients appearing in present invention apply this “on an as formulated basis” rule.

Preferably, the formula of the Artificial Bully Stick (artificial dehydrated pizzle or Bully-Stick-LIKE) pet chew of present invention includes a specific meat by-products, pizzle (or animal penis) ingredient. The advantages of including this specific meat by-products, pizzle ingredient, in the formula go as follows (from point 1 to 4):

1. This product is an extruded Artificial Bully Stick (artificial dried pizzle) pet chew with composition materials intended to imitate the properties of dried animal pizzle (traditional Bully Stick) products. A formula with pizzle will make the pet chew not only with a dried animal pizzle (traditional Bully Stick) appearance, but also with real bully stick (animal pizzle) ingredients, where product formula feature is in conformity with product appearance. Selling points of finished products are enhanced by the conformity.
2. Another advantage of applying pizzle ingredient to the Artificial Bully Stick (artificial dried pizzle) pet chew formula is that, it provides a perfect means to make full use of pizzle leftovers created from genuine bully stick manufacturing industry. A marketable genuine bully stick need be fairly long, for example at least longer than 4". A bully stick product less than for example 4" has a jeopardy of dog choking. Most popular bully stick length welcome by consumers is 6" and 12". Producing 6"/12" bully sticks by cutting a pizzle with initial length to desired length certainly generate a lot of small sized pizzle segments. These segments were purchased with a full price but manufacturers didn’t come up with a method to make good use of them. The Artificial Bully Stick (artificial dried pizzle) pet chew of present invention can well make use of the pizzle segments by for example grinding them to small piece and having them added to its composition formula.
3. Yet another advantage of applying pizzle ingredient to the Artificial Bully Stick (artificial dried pizzle) pet chew formula is that, the pizzle ingredient can provide natural pizzle flavor to the pet chew without adding artificial flavors. Natural pizzle flavor is thought to be healthier element than artificial pizzle flavor.
4. Pizzle ingredient is a natural premium protein source for a pet chew product.

Preferably, the Artificial Bully Stick (artificial dehydrated pizzle or Bully-Stick-LIKE) pet chew of present invention includes at least 3% pizzle (or animal penis) ingredient in formula. The reason why it has to be with “at least 3%” pizzle ingredients goes as follows (point 1 and 2):

1. “At least 3% pizzle” provides basic inherent attractant attracting dogs to chew on. Per palatability tests conducted by present inventor, this Artificial Bully Stick (artificial dried pizzle) pet chew with less than 3% can't provide basic inherent attraction to dogs without aid of other attractant ingredient. "At least 3% pizzle" offering "start point" palatability. We conducted palatability contrast tests to determine the smallest percentage of pizzle ingredient to put into the Artificial Bully Stick (artificial dried pizzle) pet chew. The test interprets that when the pizzle percentage goes up to 3% or larger than 3%, a jump of number of preference appears v.s. plain extruded chews w/o pizzle ingredient. And the preference is consistent when the pizzle percentage stays at 3% to 10%. Therefore 3% is determined to be the minimum pizzle percentage in the Artificial Bully Stick (artificial dried pizzle) pet chew.

2. At least 3% pizzle in formula enables product labeling to claim "with pizzle", or "with real pizzle", or "with bully stick ingredient" or "with real bully stick" on consumer packages, enhancing product selling points to consumers. A product with less than 3% pizzle can't indicate "with pizzle" on package labels legally. This is a favorable advantage for the Artificial Bully Stick (artificial dried pizzle) pet chew product to indicate "with pizzle" as a part of product name which makes the product attractive to consumers (remarks: if the ingredient goes to at least 25%, it will be applied with "dinner" rule in labeling). According to labeling model regulations by AAFCO (the Association of American Feed Control Officials), an ingredient can't appear as a part of product name or be highlighted on the principal display panel if the ingredient accounts for less than 3% in product formula on an as formulated basis.

In some embodiments, the Artificial Bully Stick (artificial dried pizzle or Bully-Stick-LIKE) pet chew (or pet chew member) includes 3%-50% pizzle ingredient.

In some embodiments, the Artificial Bully Stick (artificial dried pizzle or Bully-Stick-LIKE) pet chew (or pet chew member) includes 5%-65% (more typically 10%-25%) pizzle ingredient on an as formula basis in its formula. The Bully-Stick-LIKE pet chew (or pet chew member) with over 50% (especially over 65%) pizzle ingredient is considered too expensive, which could violate the initial intention of introducing this product. Also, the Artificial Bully Stick (artificial dried pizzle) pet chew (or pet chew member) with over 50% (especially over 65%) pizzle ingredient is considered to be able to ruin the "durability" of the pet chew. The reason is, the more an extruded pet chew contains meat (meat by-product), the less durability the extruded pet chew will be with. Pizzle is an animal source meat-by-product-ingredient. According to R&D findings by the inventor, 10%-25% pizzle ingredient in the Artificial Bully Stick (artificial dried pizzle) pet chew (or pet chew member) is an optimized one, which provides a balance between durability, material cost, sufficient inherent natural pizzle flavor and natural protein source.

We conducted palatability contrast tests to determine the starting percentage of pizzle ingredient to put into the Artificial Bully Stick (artificial dried pizzle) pet chew that can secure an absolute preference for dogs for the pet chew. The test interprets that when the pizzle percentage goes up to 10% or larger than 10%, an absolute preference appears v.s. plain extruded chews w/o pizzle ingredient. On the other hand, the more pizzle in a pet chew, the more expensive the pet chew will be. 10%-25% is a preferred pizzle percentage range in the Artificial Bully Stick (artificial dried pizzle) pet chew that can provide a balance between "palatability" and cost.

Preferably, the Artificial Bully Stick (artificial dried pizzle or Bully-Stick-LIKE) pet chew of present invention includes a plant ingredient in the formula. This Artificial Bully Stick (artificial dried pizzle) pet chew product is an extruded product. Plant ingredient is an often-used material for extruded products with advantages of (point 1, 2, 3 and 4):

1. Significantly lower cost than animal ingredients.
2. Provides vegetable nutrition offering a nutrition balance and a healthy diet.
3. Facilitates to make the Artificial Bully Stick (artificial dried pizzle) pet chew with ideal durability/hardness which enables it to imitate this essential property of dried animal pizzle (traditional Bully Stick). Plants especially plant starch is a good material for extruded products which can facilitate the achievement of ideal durability/hardness especially in an extruding process. A theory explains how it works: When the starch part of plant material is cooked or heated at a particular temperature in extruder (the temperature is generally >40° C. and what the particular temperature depends on the nature of various types of the starch), heat causes the crystalline regions of the starch to become diffuse, so that the chains begin to separate into an amorphous form. The intermolecular bonds of starch molecules begin to break down. Starch dissolves in water to a sort of paste status. Thus gelatinization occurs in the starch which offers the durability/hardness property for the pet chew.
4. Can materially imitate a desirable "translucent" outer layer of the Artificial Bully Stick (artificial dried pizzle) which is a property of traditional Genuine Bully Stick.

A typical material working as a plant ingredient is plant starch, such as (but not limited to) corn starch, sweet potato, sweet potato starch, tapioca starch and potato starch.

Preferably, the Artificial Bully Stick (artificial dried pizzle) includes at least 20% (for example 20%-90% plant, more typically 20%-50%) plant ingredient in weight on an as formulated basis.

It should be noted that the "plant" ingredient in present invention refers to all edible plant materials and edible-plant-derived materials, such as (but not limited to) vegetables, fruit, edible-plant-derived materials, vegetable-derived materials, fruit-derived materials, plant protein, vegetable protein, plant starch, vegetable starch, grains, cereals, corn, gluten-free edible plant and gluten-free vegetables. Gluten-free plant and gluten-free vegetables are preferred materials to form the "plant ingredient" since gluten materials are considered by experts in this industry as the ones that could potentially make dogs allergic. Examples of gluten-free plant material are tapioca, soybean, sweet potato, potato and carrot.

The reasons why it is preferred to be specifically larger than 20% plant ingredient in the Artificial Bully Stick (artificial dried pizzle) go as follows: 1. According to our outstanding research tests, 20% plant ingredient appearing in the Artificial Bully Stick (artificial dried pizzle) formula is the least one that can successfully facilitate recipe to make the Artificial Bully Stick (artificial dried pizzle) product with ideal durability/hardness which enables it to imitate this essential property of dried animal pizzle (traditional Bully Stick). 2. Recipe with less than 20% plant ingredient fails to do that way with unsatisfactory durability product.

The reasons why it is preferred to be with "<50% plant ingredients" goes as follows:

Since dogs are carnivorous, plant material does not attract pets very much. A pet chew product with too high plant percentage (over 50%) existing in the formula is less attractive to dogs, since dogs do not prefer vegetal material. Our tests indicate that, in an extruded pet chew product, <50% plant ingredient by weight can achieve a good malleability and durability for an extruded piece. Too much plant ingredients in it will reduce the palatability or attraction of the pet chew significantly. Our tests indicate that, in a pet chew product, when plant ingredient being >50% by weight, plant ingredient will be an absolutely primary ingredient, which makes the pet chew NOT good in palatability performance and not attractive to dogs. Therefore, in a pet chew product, ">50% plant ingredient isn't a preferred option to form the extruded pet chew of the present invention.

Preferably, the Artificial Bully Stick (artificial dried pizzle, or Bully-Stick-LIKE) component of a pet chew is typically with a length of about 6" or 12", which is considered as most popular stick length welcome by consumers. Diameter of the component could be 1 cm to 5 cm.

Preferably, the Artificial Bully Stick (artificial dried pizzle or Bully-Stick-LIKE) pet chew member includes an animal ingredient (including meat and meat by-products) ingredient in the formula.

It should be noted that the "meat" ingredient in present invention is defined as the material selected from (but not limited to) the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, hydrolyzed meat protein, hydrolyzed animal material, hydrolyzed animal protein, meat derived ingredient and poultry derived ingredient.

It should also be noted that the "meat by-product" ingredient in present invention is defined as the material typically selected from (but not limited to) the group consisting of: animal pizzle, porcine meat by-product, poultry by-product, bovine meat by-product, animal viscera, animal stomach, animal tongue, animal kidney, animal blood, animal bone, partially defatted low temperature fatty tissue, animal intestines, animal spleen, animal liver, animal lung, animal heart, animal pizzle, meat by-product meal, poultry by-product meal, hydrolyzed meat-by-product protein, hydrolyzed meat-by-product material, meat by-product derived ingredient, poultry by-product derived ingredient, gelatin, animal fat and animal oil. It should be noted that the "meat by-product" in present invention does not include rawhide material with the reasons of: A, rawhide does not have attractive flavor urging dogs to chew. B, manufacture of rawhide is relatively unregulated industry. It may create pollution to environment. H2O2 and NaOH chemicals that are used for rawhide manufacture and heavy metals may remain in finished products which harm dogs' health.

Animal ingredient (including Meat and Meat By-products) is an often-used material for extruded products with advantages of (point 1 and 2). "Animal ingredient" is defined as edible materials derived from slaughtered mammals. It includes (but not limited to) meat, meat by-products. It doesn't include hair, horns, teeth and hoofs.:

1. Inherent good palatability. Dogs are carnivorous, which have an inherent appetite to eat meat (meat by-product) food. Meat (meat by-product) ingredients in a pet chew works as an attractant providing inherent good palatability for the pet chew.
2. Nutrition. Meat (meat by-product) as a perfect source of animal protein, offering a good nutrition to dogs.

In some embodiments, the Artificial Bully Stick (artificial dried pizzle or Bully-Stick-LIKE) pet chew (or pet chew member) includes 3%-80% (typically 10%-50%) animal ingredient (meat ingredient and/or meat by-products) in its formula on an as formula basis.

The reason why it has to be with "at least 3% animal ingredient" goes as follows (point 1 and 2 below):

1. "At least 3% meat (or meat by-product)" provides basic inherent attractant attracting dogs to chew on. Per palatability tests conducted by present inventor, this Artificial Bully Stick (artificial dried pizzle) pet chew with less than 3% can't provide basic inherent attraction to dogs without aid of another attractant ingredient. "At least 3% meat (meat by-product)" offering "start point" palatability.
2. At least 3% meat (meat by-product) in formula enables product labeling to claim "with meat (meat by-product)" or "with real meat (meat by-product)" on consumer packages, enhancing product selling points to consumers. A product with less than 3% meat (meat by-product) can't indicate "with meat (meat by-product)" on package labels legally. This is a favorable advantage for the Artificial Bully Stick (artificial dried pizzle) pet chew product to indicate "with meat (meat by-product)" as a part of product name which makes the product attractive to consumers (remarks: if the ingredient goes to at least 25%, it will be applied with "dinner" rule in labeling). According to labeling model regulations by AAFCO (the Association of American Feed Control Officials), an ingredient can't appear as a part of product name or be highlighted on the principal display panel if the ingredient accounts for less than 3% in product formula on an as formulated basis.

Preferably, in addition to animal ingredient, the Artificial Bully Stick (artificial dried pizzle or Bully-Stick-LIKE) pet chew further includes a chemical in formula. The chemical is introduced to provide the Artificial Bully Stick (artificial dried pizzle) pet chew sufficient rigidity/durability and strength in finished product. The chemical is selected from the group consisting of a thickener, a humectant, a stabilizer, an emulsifier, a gelatinizer, a binder, and a filler.

The thickener is selected from the group consisting of: glucose syrup, malt syrup, soy protein Isolate, wheat protein isolate, corn protein isolate, artemisia gum, linseed gum, deacetylated chitin, pectins, sodium alginate, xanthan gum, carrageenan; phosphated distarch phosphate, sodium lactate, diacetyl tartaric acid ester of mono(di)glycerides(DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch.

The humectant is selected from the group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate.

The stabilizer is selected from the group consisting of: trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

The emulsifier is selected from the group consisting of: soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glycerides of fatty acids, modified soybean phospholipid, sodium caseinate, citric and fatty acid esters of glycerol, lactic and fatty acid esters of glycerol, sodium starch octenyl succinate and acetylated mono and diglyceride (acetic and fatty acid esters of glycerol).

The gelatinizer is selected from the group consisting of: soy protein Isolate, wheat protein isolate, corn protein isolate, propylene glycol, glucono delta-lactone.

The binder is selected from the group consisting of: glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar.

The filler is selected from the group consisting of: a plant material, a plant derived material, a plant protein and a plant starch, saccharide, dextrin, lactose, mineral salt and fructose.

In some embodiments, the Artificial Bully Stick (artificial dried pizzle or Bully-Stick-LIKE) pet chew of present invention is free of rawhide materials with the concerns of drawbacks of rawhide mentioned in previous paragraph.

In some embodiments to form a composition for making the Artificial Bully Stick (artificial dried pizzle or Bully-Stick-LIKE) pet chew, in addition to animal ingredient, rawhide material is used. A small percentage of rawhide (for example <20%) may help strengthen the durability of the pet chew having an artificial dehydrated/dried pizzle component. But due to the disadvantages of rawhide material as mentioned in above Paragraphs, rawhide material to be used to form the composition is required to be at a limited percentage by weight. It's anticipated that when rawhide percentage in the composition goes higher than 50%, rawhide material may be an absolute majority ingredients existing in the pet chew formula, which makes the pet chew product an rawhide based product. A pet chew product made from rawhide-based material is thought to significantly involve in an unhealthy product concern and environment harm concern. Therefore, it is optimal that in the embodiments that rawhide exists in the formula of the Artificial Bully Stick (artificial dried pizzle) pet chew, rawhide material account for less than 50% in weight in its formula. More typically, rawhide material account for 5%-20% in weight in its formula.

In some embodiments of present invention, the Artificial Bully Stick (artificial dried pizzle or Bully-Stick-LIKE) pet chew of present invention includes a plant ingredient (>20%) and an animal ingredient (typically meat or meat-by-product. remarks: meat-by-product includes pizzle) in the formula, forming a pet chew with a texture resembling that of dried animal pizzle (traditional Bully Stick) product. All prior arts fail to disclose that plant and animal ingredients with a proper content percentage existing in a composition material can enable the composition material extrudate to obtain a finished product appearance/texture/rigidity resembling that of dried animal pizzle (traditional Bully Stick) product.

In some embodiments of present invention, the Artificial Bully Stick (artificial dried pizzle or Bully-Stick-LIKE) pet chew of present invention is made of a collagen-based material. The artificial dehydrated pizzle component 1400A from FIG. 14 may be formed from a collagen-based multi-layered extrudate having an outer layer in a tube form with a cross-section profile 1400D.

In some embodiments of present invention, the Artificial Bully Stick (artificial dried pizzle or Bully-Stick-LIKE) pet chew of present invention is made of a collagen-based material having at least 10% collagen or at least 20% collagen-rich material (such as corium layer of animal skin, turkey tendon and cartilage). The collagen-based material may additional have at least 20% plant ingredient.

In some embodiments of present invention, the Artificial Bully Stick (artificial dried pizzle or Bully-Stick-LIKE) pet chew of present invention is made of a collagen-based material having at least 20% collagen or at least 30% collagen-rich material (such as corium layer of animal skin, turkey tendon and cartilage). The collagen-based material may additional have at least 20% plant ingredient.

In some embodiments of present invention, the Artificial Bully Stick (artificial dried pizzle or Bully-Stick-LIKE) pet chew of present invention is made of a collagen-based material having at least 20% collagen or at least 50% collagen-rich material (such as corium layer of animal skin, turkey tendon and cartilage). The collagen-based material may additional have at least 20% plant ingredient.

In some embodiments of present invention, the Artificial Bully Stick (artificial dried pizzle or Bully-Stick-LIKE) pet chew of present invention includes a hydrolyzed animal protein ingredient and a plant ingredient (>20%) in the formula. The hydrolyzed animal protein (for example hydrolyzed meat protein) works as an attractant in the recipe.

In some embodiments of present invention, the Artificial Bully Stick (artificial dried pizzle or Bully-Stick-LIKE) pet chew of present invention includes a pizzle ingredient and a plant ingredient (>20%) in the formula.

In some embodiments of present invention, the Artificial Bully Stick (artificial dried pizzle or Bully-Stick-LIKE) pet chew of present invention includes a pizzle ingredient, a plant ingredient and a meat ingredient in the formula.

In yet some other embodiments of present invention, the Artificial Bully Stick (artificial dried pizzle) pet chew of present invention includes a plant ingredient (>20%) and a meat by-products ingredient in the formula.

In an embodiment of present invention, the Artificial Bully Stick (artificial dried pizzle or Bully-Stick-LIKE) pet chew of present invention includes 20%-50% plant ingredient, 10%-50% meat ingredient and a chemical.

In an embodiment of present invention, the Artificial Bully Stick (artificial dried pizzle or Bully-Stick-LIKE) pet chew of present invention includes 0.3%-5% hydrolyzed animal protein ingredient, 20%-90% plant ingredient, 5%-50% meat ingredient and a chemical.

In an embodiment of present invention, the Artificial Bully Stick (artificial dried pizzle or Bully-Stick-LIKE) pet chew of present invention includes 5%-25% pizzle, 50%-90% plant ingredient and a chemical.

In an embodiment of present invention, the Artificial Bully Stick (artificial dried pizzle or Bully-Stick-LIKE) pet chew of present invention includes 3%-25% meat by-products, 50%-90% plant ingredient and a chemical.

In an embodiment of present invention, the Artificial Bully Stick (artificial dried pizzle or Bully-Stick-LIKE) pet chew of present invention includes 5%-25% pizzle, 20%-50% plant ingredient, 10-50% animal-hide ingredient and a chemical.

Figure 13:
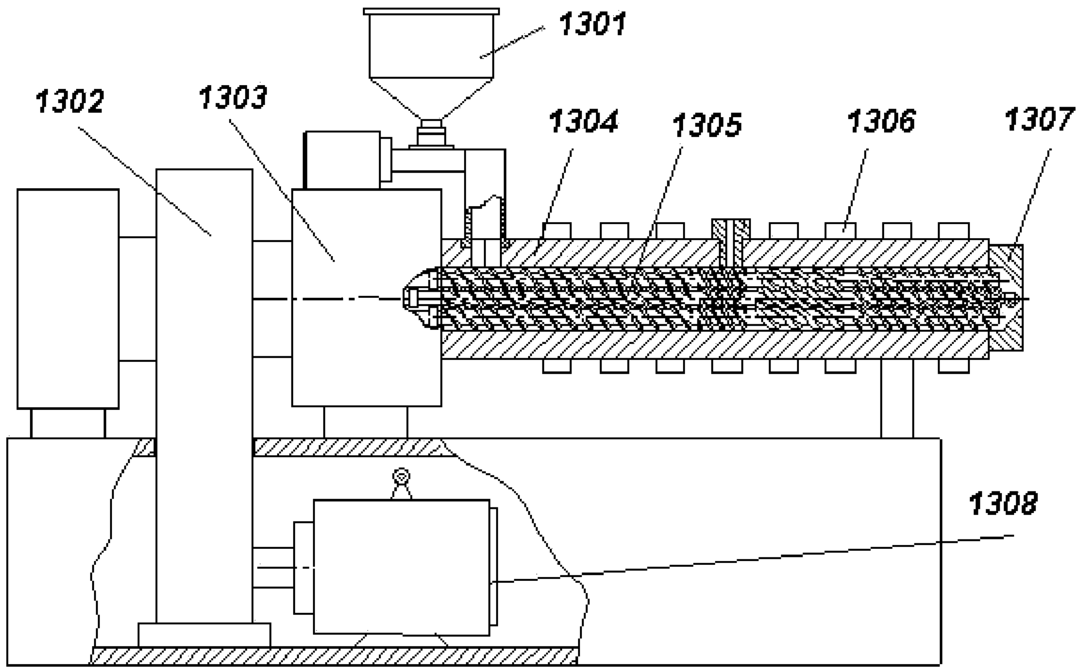
FIG 13 PRIOR ART
FIG. 13 is a prior art, a top plan view of a typical extruder, a machine system for producing pet chew products.

Preferably, the Artificial Bully Stick (artificial dried pizzle or Bully-Stick-LIKE) pet chew is formed by extruding process with an extruder (typically co-extruding process). The reasons for a preference of extruding process include: A, Extruding process can achieve an outer layer texture imitating that of dried animal pizzle (traditional Bully Stick). Extruding process is viewed as the best one. While being extruded, a pressure acts on the composition material which provides durability/texture to finished products; B, perfect for a stick shaped chew component (the initially-stick-shaped component may be further re-shaped to final end product configuration). C, Extruding is a very efficient process, which provides a low cost processing for making the products; D, Provides large capacity for a single workshop with limited scale. Co-extruding is a preferred process to produce this pet chew having an artificial dehydrated/dried pizzle component product because co-extruding process can well provide two separate pet chew members (outer layer and inner member) with different quality, which imitates dried animal pizzle (traditional Bully Stick). Now refer to FIG. 13, a drawing of a typical extruder, a machine system for producing pet chew products. The components of the extruder are as follows: 1301—hopper, 1302—reduction gearbox, 1303—power distributor, 1305—screw, 1306—heater, 1307—extruder die and 1308—motor.

In some embodiments of present invention, artificial dehydrated/dried pizzle component of the pet chew are formed by co-extruding process and the formula forming the outer layer is different from the one forming the inner member. The intention to apply different formulas to the outer layer and the inner member is to achieve different texture, and/or looking, and/or coloring, and/or durability/hardness, and/or density, etc., which could make one distinguished from the other, imitating dried animal pizzle (traditional Bully Stick) products.

As a preferred process for making the Artificial Bully Stick (artificial dried pizzle or Bully-Stick-LIKE) pet chew of present invention, it includes (from point A to D):

(A). Prepare composition A and B. (Composition A is for forming outer layer of the Artificial Bully Stick (artificial dried pizzle) pet chew and Composition B is for forming inner member of the Artificial Bully Stick (artificial dried pizzle) pet chew. At least one of A and B has meat-by-product ingredient (for example pizzle) ingredient in its formula. The whole pet chew formula may include 20%-50% plant ingredient, 10%-50% meat (meat by-product) ingredient and 5%-25% pizzle)

(B). Deliver the Composition A and Composition B into a co-extrusion extruder, and heat the compositions in the extruder at a high temperature at least 40° C. before their being extruded at the extruder die to an extrudate. Extrude the compositions with the extruder.

(C). (optional) reshape or manipulate the extrudate to a desired end product form by hand or machine. For example, the stick-shaped extrudate is reshaped into a curved form, such as a curl, twist, ring, spiral, spring, helix, pretzel shape, dual-stand braid, triple-strand-braid and knots, knotted bone, heart icon shape, triangle, quadrangle, pentagon, peanut icon shape, shape of Arabic numeral "8", curved lines, open curve, closed curve, open circle, closed circle).

(D). Divide the extrudate to pre-determined smaller sized ones in final end product size.

(E). Dry and harden the product by heating for sufficient time and obtain a final finished dog chew product. Moisture of final finished products is 8%-18%.

Here are some embodiments of present invention with various pet chew shapes/configurations.

Now refer to FIG. 2, pet chew 0200 is an embodiment of present invention, an edible pet chew formed from a member of Artificial Bully Stick (artificial dried pizzle) member in a form of knotted bone shape. The artificial dried pizzle component is an extrudate initially being in a stick shape after leaving extruder and later is finally manipulated or shaped into a curved form producing a final end product shape like a knot. 0201 refers to the outer layer of the Artificial Bully Stick (artificial dried pizzle) member, and 0202, inner member. 0203 refers to the groove configuration existing in the Artificial Bully Stick (artificial dried pizzle) member and running longitudinally on the surface. 0204 refers to a translucent area of the outer layer where inner member inside is a bit visible through it. The artificial dried pizzle component is an extrudate formed by extrusion, in which the extrudate initially is in a stick/cylinder/rod form and then further re-shaped or manipulated by hand by curving the extrudate into a knotted bone configuration before its being hardened by heat treatment.

Figure 3:
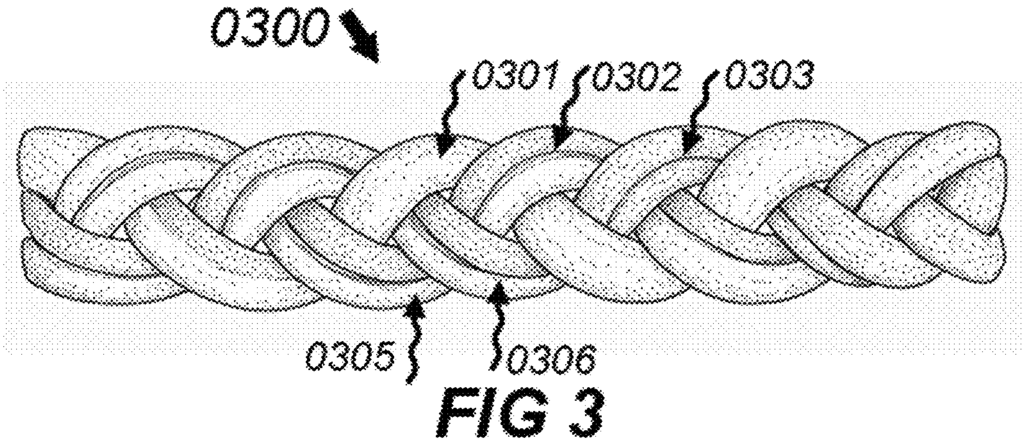
FIG. 3 is a top plan view of a pet chew with three separate members of Artificial Bully Stick members, being curved and woven together.

Now refer to FIG. 3, 0300 is an embodiment of present invention, an edible pet chew with three separate Artificial Bully Stick (artificial dried pizzle) components (0301, 0302 and 0303) woven together. 0305 is a groove existing on the surface of Artificial Bully Stick (artificial dried pizzle) component 0302 running longitudinally. 0306 is a groove existing in the Artificial Bully Stick (artificial dried pizzle) component 0303. The artificial dried pizzle components are extrudates formed by extrusion, in which the extrudates initially are in a stick/cylinder/rod form and then further re-shaped or manipulated by hand by curving the extrudates and braiding into a braid configuration before its being hardened by heat treatment.

Figure 4:
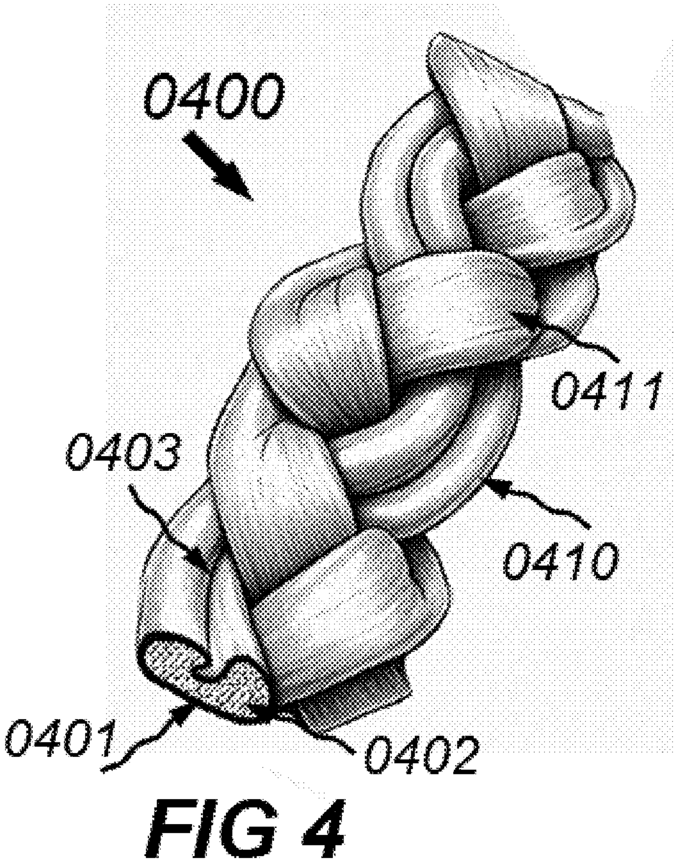
FIG. 4 is a top plan view of an Artificial Bully Stick pet chew in a braid configuration with an artificial dehydrated pizzle component and animal hide sheets (a source of collagen) being woven together.
Figure 5:
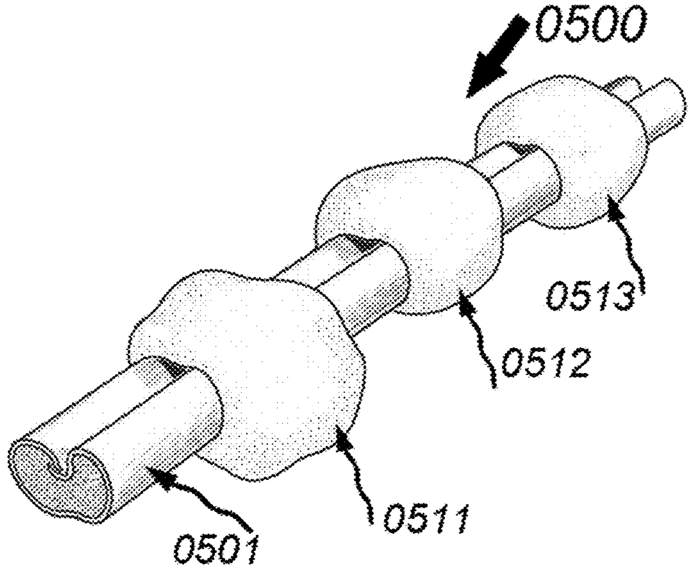
FIG. 5 is a top plan view of a kabob-shape edible pet chew with a member of Artificial Bully Stick component 0501 and three members of composition balls 0511/0512/0513.

Now refer to FIG. 4, 0400 is an embodiment of present invention, an Artificial Bully Stick (artificial dried pizzle) pet chew in braid shape formed from two pieces of animal hide sheets 0411 (a source of collagen) and a member of Artificial Bully Stick (artificial dried pizzle) 0410. 0403 is a groove existing on the Artificial Dehydrated Pizzle component running longitudinally. The artificial dried pizzle component is an extrudate formed by extrusion, in which the extrudates initially is in a stick/cylinder/rod form and then further re-shaped or manipulated by hand by curving the extrudates before its being hardened by heat treatment. and braiding into a braid configuration with animal hide strips Now refer to FIG. 5. 0500 is a kabob-configurationed edible pet chew with a member of Artificial Bully Stick (artificial dried pizzle) component 0501 and three members of balls 0511/0512/0513 which are formed from an edible composition material. Members of 0511/0512/0513 are hand-made dough (balls) with ingredients including chicken breast (30%-60%), plant protein, rice flour, glycerin, being attached to Artificial Dehydrated Pizzle component 0501. Member of Artificial Dehydrated Pizzle 0501 is in a stick form, same as 0100 in FIG. 1. Alternatively, the outer layer of artificial bully stick component 0501 can be formed from a rolled/curved sheet wrapping the inner portion inside as casing, where the sheet is a separate component without being attaching to the inner portion as a whole and the outer layer and inner portion are produced separately before being assembled together rather than forming the outer layer and inner portion integrally. The number of composition ball could also vary according from 1 to 5 according to desire.

Figure 12:
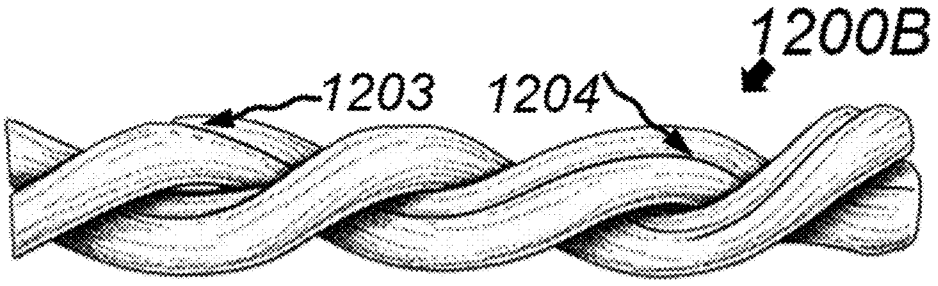
FIG. 12 is a top plan view of a pet chew with two separate members of Artificial Bully Stick members, being curved and woven together.

Now refer to FIG. 12, 1200 is an embodiment of present invention, an edible pet chew with three separate Artificial Bully Stick (artificial dried pizzle) components woven together. Grooves 1203 and 1204 are grooves existing on the surface of an Artificial Bully Stick (artificial dried pizzle) component running longitudinally. The artificial dried pizzle components are extrudates formed by extrusion, in which the extrudates initially are in a stick/cylinder/rod form and then further re-shaped or manipulated by hand by curving the extrudates to a curved form and braiding into a braid configuration before its being hardened by heat treatment.

FIG. 12 is a top plan view of a pet chew with two separate members of Artificial Bully Stick members, being curved and woven together.

Figure 14:
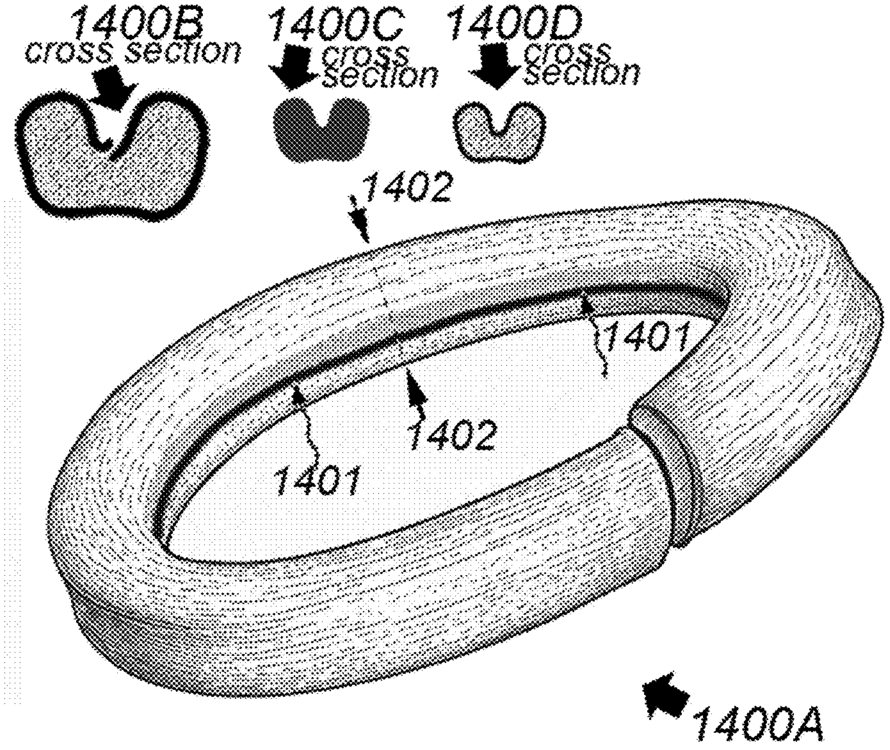
FIG. 14 is a view of an Artificial Bully Stick (or say Bully-Stick-LIKE) pet chew according to the disclosure in a ring configuration with a cross-section outline shape similar to capital letter "B".

Now refer to FIG. 14, pet chew 1400A is an embodiment of present invention, an edible pet chew formed from a member of Artificial Bully Stick (artificial dried pizzle) member in a form of ring shape. 1401 refers to the groove configuration existing in the Artificial Bully Stick (artificial dried pizzle) member and running longitudinally on the surface. The artificial dried pizzle component is an extrudate formed by extrusion, in which the extrudate initially is in a stick/cylinder/rod form and then further re-shaped or manipulated by hand by curving the extrudate into a ring shape before its being hardened by heat treatment. By applying different extrusion equipment and/or extruder dies, 1400A can be formed with alternative cross-section profiles 1400B, 1400C and 1400D, alternatively.

The artificial dehydrated pizzle component 1400A from FIG. 14 may also be formed from a collagen-based multi-layered extrudate having an outer layer in a rolled/curved sheet form with a cross-section profile 1400B. The curved/rolled sheet can be a separate layer forming a casing of the whole treat apart from the inner portion.

In some embodiments of present invention, a new Edible Material member is applied together with a member of Artificial Bully Stick (artificial dried pizzle) component 0100, where the edible material member and the Artificial Bully Stick (artificial dried pizzle) member are assembled together to form a pet chew. The Artificial Bully Stick (artificial dried pizzle) component 0100 may be pre-shaped to a new shape before being assembled with the edible material member according to desired finished pet chew structure. Examples of the edible material includes: an animal pizzle material, a cartilage, a trachea, an animal ear, an esophagus, a ligament, a pericardium, an animal tendon, corium layer of animal skin, dermis layer of animal skin, innermost layer of animal skin and inner layer of animal skin.

In some embodiments of present invention, a member of animal hide (say rawhide-free animal hide) may be applied together with a member of Artificial Bully Stick (artificial dried pizzle) 0100, where the animal hide (rawhide-free animal hide) member and the Artificial Bully Stick (artificial dried pizzle) member are assembled together to form a pet chew. The Artificial Bully Stick (artificial dried pizzle) component 0100 may be pre-shaped to a new shape before being assembled with the animal hide member according to desired finished pet chew structure. Now refer to FIG. 4, an edible pet 0400 is created with a member of Artificial Bully Stick 0410 and an animal hide (source of collagen) member 0411 assembled together.

In yet some embodiments of present invention, a member of Genuine Animal Pizzle material may be applied together with a member of Artificial Bully Stick (artificial dried pizzle) component 0100, where the Genuine animal Pizzle material member and the Artificial Bully Stick (artificial dried pizzle) member are assembled together to form a pet chew.

As a formula embodiment to form the composition to produce the Artificial Bully Stick (artificial dried pizzle) component of a pet chew, the composition is consisting of: Rice flour (67.2%, classified as plant ingredient), vegetable glycerin (8%), gelatin (7%), fresh chicken breast (5% classified as meat ingredient), ground bovine tendon (3%, classified as meat-by-product ingredient), cellulose powder (2%, classified as plant ingredient), calcium carbonate (2%), sweet potato (2%, classified as plant ingredient), lecithin (1%), carrageenan gun (1%), hydrolyzed pizzle (0.5% classified as meat-by-product ingredient), brewers yeast (0.5%), titanium dioxide (0.4%), FD&C yellow 6 (0.2%), FD&C red 40 (0.1%), FD&C blue 1 (0.1%). In this formula, meat-by-product ingredient occupies 3.5% in the formula, plant ingredient totally 71.2%, and meat 5%. Vegetable glycerin, calcium carbonate and carrageenan gum are some chemicals.

As another formula embodiment to form the composition to produce the Artificial Bully Stick (artificial dried pizzle) component of a pet chew, the composition is consisting of: Rice flour (43.6%, classified as plant ingredient), fresh chicken breast (30%, classified as meat ingredient), vegetable glycerin (8%), gelatin (7%), chicken cartilage (2% classified as meat ingredient), cellulose powder (2%, classified as plant ingredient), calcium carbonate (2%), sweet potato (2%, classified as plant ingredient), lecithin (1%), carrageenan gum (1%), brewers yeast (1%), titanium dioxide (0.4%). In this formula, plant ingredient occupies totally 47.6% in the formula, and meat totally 32%. Vegetable glycerin, calcium carbonate and carrageenan gun are some chemicals.

As another formula embodiment to form the composition to produce the Artificial Bully Stick (artificial dried pizzle) component of a pet chew, the composition is consisting of: Fresh chicken breast (28.00%, classified as meat ingredient), tapioca starch (20.00%, classified as plant ingredient), ground pizzle (12.00%, classified as pizzle ingredient), gelatin (12.00%), vegetable glycerin (8.00%), beef skin (5.00%), sorbitol (3.60%), cellulose powder (3.00%, classified as plant ingredient), calcium carbonate (3.00%), sweet potato (2.00%, classified as plant ingredient), lecithin (1.00%), carrageenan gum (1.00%), brewers yeast (1.00%), titanium dioxide (0.40%). In this formula, pizzle ingredient occupies 12% in the formula, meat 28% and plant ingredient totally 25%. Vegetable glycerin, sorbitol, calcium carbonate and carrageenan gun are some chemicals.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An edible pet chew, comprising:

an artificial-dried-pizzle component formed from a stick-shaped extrudate for imitating a dried animal pizzle product, wherein said stick-shaped extrudate is initially in a stick shape and is finally reshaped to a curved form in final end product, wherein said artificial-dried-pizzle component is in a form imitating a shape of a dried animal pizzle product, wherein said artificial-dried-pizzle component has a groove running longitudinally on its surface, wherein an average depth of said groove is at least 0.5 mm, wherein said artificial-dried-pizzle component comprises an outer layer and an inner portion, wherein said outer layer surrounds said inner portion, wherein said inner portion is free of small holes spread homogeneously to said inner portion entire body, wherein said artificial-dried-pizzle component is made of a composition material, wherein said composition material comprises a first composition and a second composition, wherein said outer layer is made of said first composition and said inner portion is made of said second composition, and wherein said composition material comprises at least 20% plant ingredient by weight in its formula.

2. The edible pet chew, as recited in claim 1, wherein said first composition and said second composition are co-extruded to form said outer layer and said inner portion respectively so as to have said outer layer surround said inner portion, and wherein said groove is formed on said outer layer at the same time when said first composition and said second composition are co-extruded to form said outer layer and said inner portion respectively.

3. The edible pet chew, as recited in claim 1, wherein said artificial-dried-pizzle component is formed by co-extruding process, wherein said groove is formed by an extruder die with a pre-designed shape, and wherein said composition material further comprises an animal ingredient in its formula.

4. The edible pet chew, as recited in claim 1, wherein said composition material further comprises at least 3% animal ingredient by weight on an as formulated basis.

5. The edible pet chew, as recited in claim 1, wherein the thickness of said outer layer of said artificial-dried-pizzle component ranges from 0.3 mm to 5 mm, wherein the thickness of said outer layer is substantially homogenous, and wherein a cross section of said artificial-dried-pizzle component has an outline shape similar to any one of: a capital letter "B" shape, a peanut shape, an Arabic numeral "8" shape, peanut icon shape, cashew nut icon shape, or heart icon shape.

6. The edible pet chew, as recited in claim 1, wherein said composition material comprises 20%-90% plant ingredient by weight on an as formulated basis in the formula.

7. The edible pet chew, as recited in claim 1, wherein said composition material is made of a collagen-based material, wherein said collagen-based material comprising at least 10% collagen and at least 20% plant ingredient in end product, and wherein said collagen-based material comprising an ingredient selected from the group consisting of: animal skin, beef skin, pork skin, bovine skin, porcine skin, dermis layer of animal skin, innermost layer of animal skin, inner layer of animal skin, cartilage, trachea, animal ear, poultry foot, esophagus, animal pizzle, ligament, pericardium, animal tendon, eggshell membrane and any a combination there of.

8. The edible pet chew, as recited in claim 1, wherein said composition material further comprises an animal ingredient in its formula, and wherein said animal ingredient is an ingredient selected from the group consisting of meat, meat by-products ingredient, animal skin, dehydrated animal protein and dehydrated animal pizzle protein.

9. The edible pet chew, as recited in claim 8, wherein said meat by-products ingredient is an animal pizzle material which occupies at least 3% by weight on an as formulated basis in the formula of said composition material.

10. The edible pet chew, as recited in claim 8, wherein said composition material comprises 3%-50% meat by-products ingredient or 3%-50% meat ingredient by weight on an as formulated basis.

11. The edible pet chew, as recited in claim 8, wherein said composition material comprises 20%-50% plant ingredient by weight on an as formulated basis and 10%-50% meat ingredient by weight on an as formulated basis.

12. The edible pet chew, as recited in claim 9, wherein said composition material comprises 20%-50% plant ingredient by weight on an as formulated basis, 3%-25% animal pizzle material by weight on an as formulated basis and 10%-50% animal hide ingredient by weight on an as formulated basis.

13. The edible pet chew, as recited in claim 1, wherein said at least 20% plant ingredient is an ingredient selected from the group consisting of: potato, sweet potato, mung bean, wheat, corn, tapioca, rice, pea, soybean, peanut, almond, mushroom, legumes, beans, grains, chia seed, algae, seaweed, spirulina, cereals, a material of plant edible part, a plant derived material, a plant protein, a plant starch, a plant fiber, a vegetable material, a vegetable derived material, a vegetable protein, a vegetable starch, and any combination thereof.

14. The edible pet chew, as recited in claim 8, wherein said composition material comprises 10%-50% meat or meat by-product ingredient on an as formulated basis in the formula by weight and a chemical, wherein said meat ingredient is selected from the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, hydrolyzed meat protein, hydrolyzed animal material, hydrolyzed animal protein, meat derived ingredient, and poultry derived ingredient, and wherein said meat by-product ingredient is selected from the group consisting of: animal pizzle, porcine meat by-product, poultry by-product, bovine meat by-product, animal viscera, animal stomach, animal tongue, animal kidney, animal blood, animal bone, partially defatted low temperature fatty tissue, animal intestines, animal spleen, animal liver, animal lung, animal heart, meat by-product meal, poultry by-product meal, hydrolyzed meat-by-products protein, hydrolyzed meat-by-products material, meat by-product derived ingredient, poultry by-product derived ingredient, animal fat, and animal oil.

15. The edible pet chew, as recited in claim 1, wherein said curved form is selected from the group consisting of: a curl form, twist form form), ring shape, spiral form, spring form, helix shape, pretzel shape, dual-stand braid form, triple-strand-braid form, knot form, knotted bone form, heart icon shape, triangle shape, quadrangle shape, pentagon shape, peanut icon shape, Arabic numeral "8" shape, curved line form, open curve, closed curve, open circle form, closed circle form.

16. The edible pet chew, as recited in claim 6, wherein said edible pet chew further comprises an edible material component, wherein said artificial-dried-pizzle component and said edible material component are assembled together to form a final product.

17. The edible pet chew, as recited in claim 16, wherein said edible material component is a second piece of artificial-dried-pizzle component, and wherein said a first and a second piece of artificial-dried-pizzle components are woven together to make a final product in a braid form.

18. The edible pet chew, as recited in claim 16, wherein said edible material component is any one of: an animal hide material, an animal pizzle material, a cartilage, a trachea, an animal ear, an esophagus, a ligament, a pericardium, an animal tendon, corium layer of animal skin, dermis layer of animal skin, innermost layer of animal skin and inner layer of animal skin.

19. The edible pet chew, as recited in claim 1, further comprising:

a second artificial dried pizzle component, wherein said first artificial dried pizzle component and said second artificial dried pizzle component are assembled together into a twisted form, and wherein after assembly, an end of said first artificial dried pizzle component and an end of said second artificial dried pizzle component exist at the same side of the finished product.

20. The edible pet chew, as recited in claim 1, further comprising:

a second artificial dried pizzle component and a third artificial dried pizzle component, wherein said first artificial dried pizzle, said second artificial dried pizzle and said third artificial dried pizzle component are assembled together into a braid form.

* * * * *